United States Patent [19]
Kubo et al.

[11] Patent Number: 6,057,952
[45] Date of Patent: May 2, 2000

[54] LIGHT SCANNING DEVICE AND CONFOCAL OPTICAL DEVICE USING THE SAME

[75] Inventors: Mitsunori Kubo, Hachioji; Akiko Murata, Kunitachi, both of Japan; Gordon S. Kino, Stanford, Calif.; David L. Dickensheets, Bozeman, Mont.

[73] Assignees: Olympus Optical Co., Ltd., Tokyo, Japan; Bd. of Trustees of Leland Stanford Junior University, Palo Alto, Calif.

[21] Appl. No.: 09/322,799

[22] Filed: May 28, 1999

Related U.S. Application Data

[63] Continuation-in-part of application No. 09/231,439, Jan. 14, 1999.

[51] Int. Cl.[7] .................................................... G02B 26/08
[52] U.S. Cl. .......................... 359/196; 359/198; 359/199; 359/201; 359/202; 359/205; 359/207; 359/212; 359/213; 359/214; 359/215; 359/223
[58] Field of Search .................................... 359/196–226, 359/364–366, 726–732, 850, 857–859, 227, 234–336, 368, 385, 389; 385/27, 28, 88, 89; 250/234

[56] References Cited

U.S. PATENT DOCUMENTS

| | | | |
|---|---|---|---|
| 5,081,349 | 1/1992 | Iwasaki | 250/234 |
| 5,122,653 | 6/1992 | Ohki | 250/216 |
| 5,132,526 | 7/1992 | Iwasaki | 250/201.3 |
| 5,159,495 | 10/1992 | Hamblen | 359/731 |
| 5,546,214 | 8/1996 | Black et al. | 359/203 |
| 5,742,419 | 4/1998 | Dickensheets et al. | |

*Primary Examiner*—James Phan
*Attorney, Agent, or Firm*—Frishauf, Holtz, Goodman, Langer & Chick, P.C.

[57] ABSTRACT

A light scanning type confocal optical device comprises a light source section, a light transmitting section, a light scanning section, and a processing section. The scanning section includes a movable mirror, a fixed mirror and a converging lens. The movable mirror has an opening at the center, and is supported to be swingable about at least one axis. The fixed mirror is fixedly supported by an optically transparent plate. Reflection surfaces of the movable and fixed mirrors are located opposed to each other. The transmitting section includes an optical fiber having a core, whose end face substantially functions as a confocal pinhole. The light from the end face of the core is, upon passing through the opening, reflected by the fixed mirror toward the movable mirror. The light from the fixed mirror is then reflected by the movable mirror, and is converged by the converging lens onto an object surface.

36 Claims, 14 Drawing Sheets

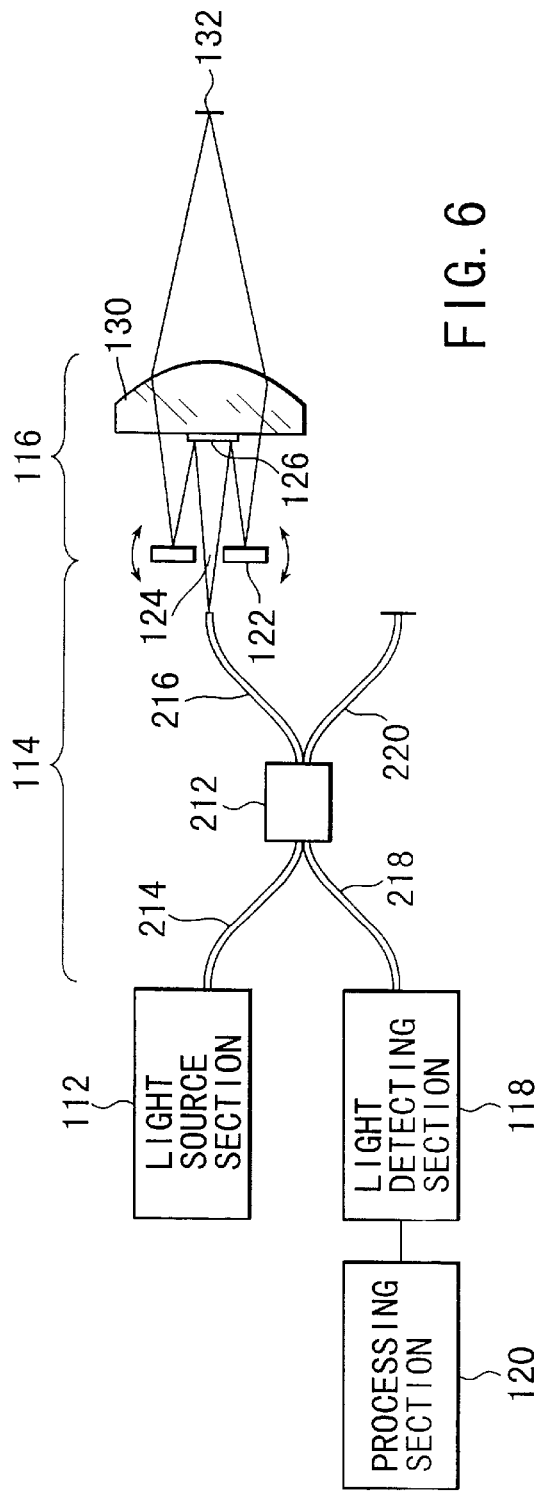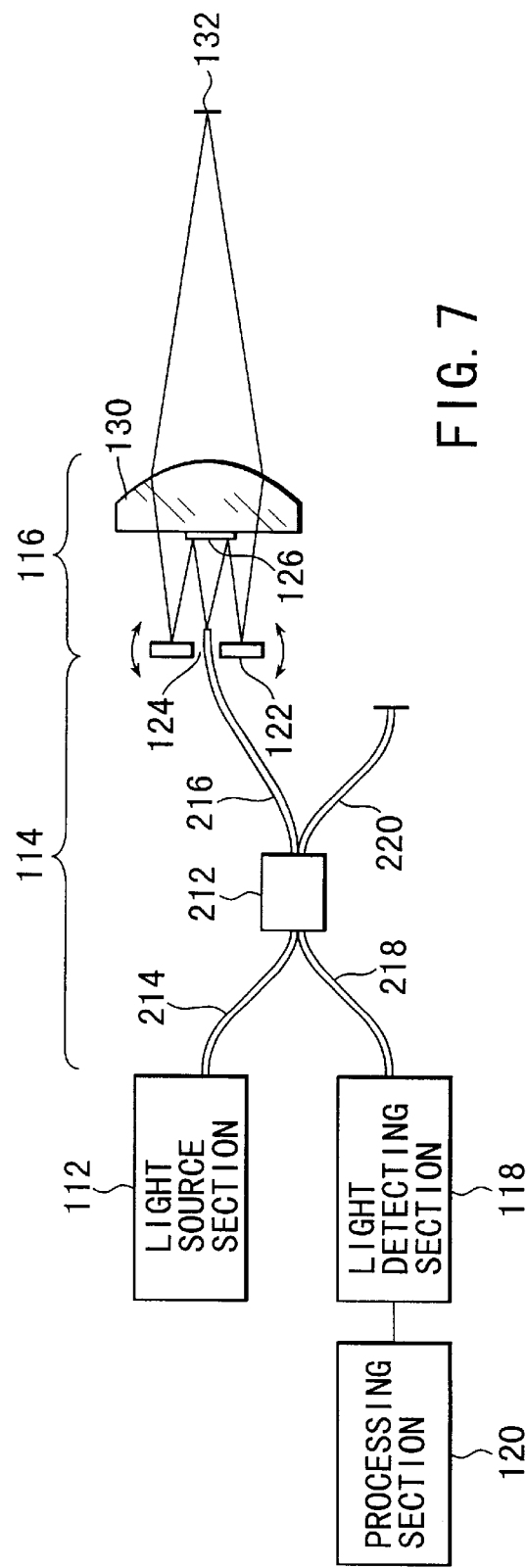

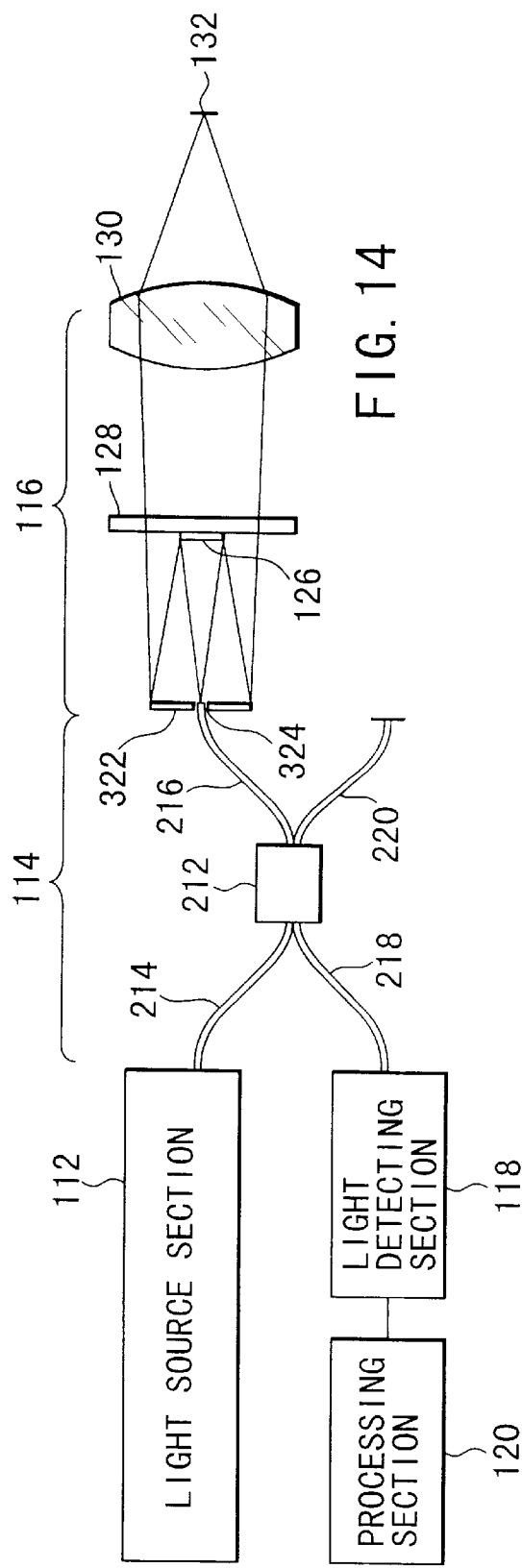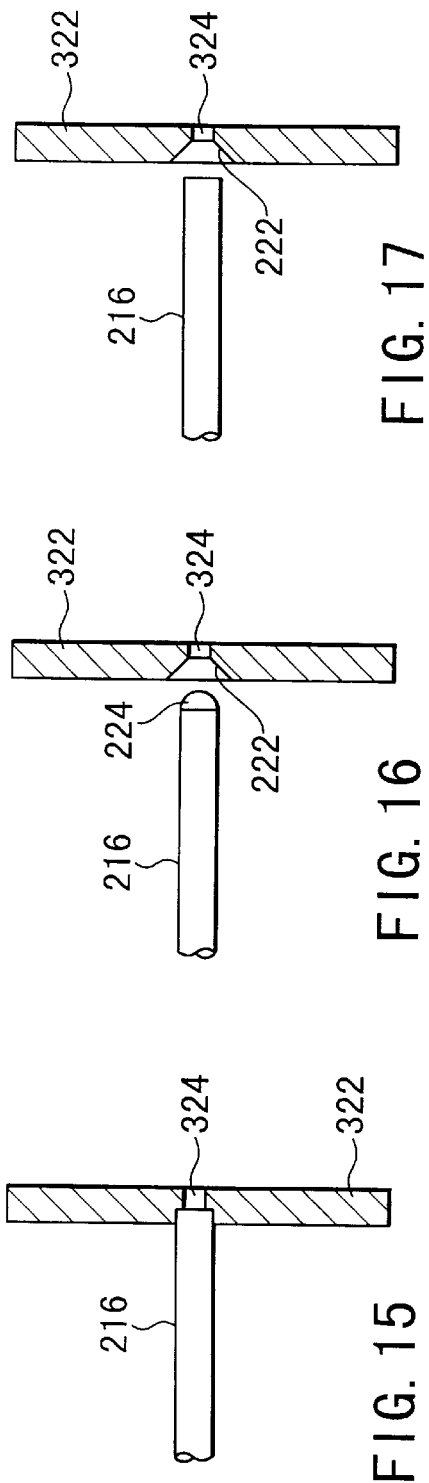

LIGHT SCANNING DEVICE AND CONFOCAL OPTICAL DEVICE USING THE SAME

CROSS-REFERENCE TO RELATED APPLICATION

This is a Continuation-in-Part application of U.S. patent application Ser. No. 09/231,439, filed Jan. 14, 1999, pending the entire contents of which are incorporated herein by reference.

BACKGROUND OF THE INVENTION

The present invention relates to a light scanning type confocal optical device, which scans light emitted from a light source over the surface of an object, and detects light reflected from the surface or fluorescence, and also relates to a light scanning device applied to the optical device.

In recent years, the light scanning type confocal optical microscope has been known as means for minutely observing living tissue or the surface or the inside of cells. The confocal optical microscope has a resolving power exceeding that of an ordinary optical system and, in addition, can obtain a three-dimensional image. However, an ordinary confocal optical microscope has a large optical system, and can not practicably be inserted into the living body. Thus, in general, living tissue is removed from the body in order for the tissue to be observed with the ordinary confocal optical microscope.

In order to overcome this disadvantage, a smaller optical system of a light scanning type micro-confocal microscope is disclosed in the literature "Micromachined scanning confocal optical microscope" (OPTICS LETTERS, Vol. 21, No 10, May, 1996) or U.S. Pat. No. 5,742,419.

The literature suggests the possibility with which a three-dimensional image could be obtained in real time. To be more specific, the above light scanning type micro-confocal microscope, as shown in FIG. 30, comprises a light source 1, a light transmitting section 2, a light detecting section 3, a light scanning section 4, and a processing section 5. The light transmitting section 2 has a single mode fiber. The light scanning section 4 is inserted into the living body through an endoscope. By virtue of this, a three-dimensional image of the inside of the living body could be obtained in real time.

FIG. 31 shows the structure of the light scanning section 4. In the light scanning section 4, a laser light is emitted from the light source 1, and transmitted through the single mode fiber 10. Then, it is reflected by a reflection surface 11, and deflected in an X direction by an electrostatic mirror 12 for scanning light in the X direction. Thereafter, it is totally reflected by a reflection portion 14, deflected in a Y direction by an electrostatic mirror 13 for scanning light in the Y direction, and then converged onto an object surface 16 by a diffraction lens 15.

An end face of the single mode fiber 10 has a conjugate relationship with the object surface 16. Accordingly, the light reflected from the object surface 16 turns back on the above optical path, and converges on the end face of the single mode fiber 10. To be more specific, the light reflected from the object surface 16 is incident on the diffraction lens 15, and thereafter reflected successively by the electrostatic mirror 13, the reflection portion 14, the electrostatic mirror 12, and the reflection surface 11 in that order. Then, it is converged on the end face of the single mode fiber 10 by a converging function of the diffraction lens 15. The converged light is transmitted through the single mode fiber 10 of the light transmitting section 2, and detected by the light detecting section 3.

The above optical system comprises a confocal optical system, since the end face of the core of the single mode fiber 10 functions as a pinhole. Thus, scattered light from that portion of the object surface 16 which excludes a convergence point is sufficiently weak in intensity at the end face of the fiber 10, and hardly detected by the light detecting section 3.

Therefore, the above optical system has high resolution in a horizontal direction (XY direction) of the object surface 16 and a depth direction (Z direction) of the object surface 16, as compared with the ordinary optical system. In other words, it has higher longitudinal and transverse resolving powers than the ordinary optical system.

The above light scanning type micro-confocal optical microscope has a lower resolving power than the ordinary confocal optical microscope; however, its resolving power is sufficient for diagnosis involving observation of an internal organ or the like. In addition, the micro-confocal optical microscope has a considerably compact structure.

In insertion of such a micro-confocal optical microscope into the living body through the endoscope to observe the inside of the body, its view direction obliquely crosses its insertion direction. Accordingly, it is difficult to accurately move the object surface 16 in the Z direction only. In other words, the above micro-confocal microscope has bad observational operability.

Furthermore, the conventional micro-confocal microscope uses two reflection surfaces 11 and 14 and two one-dimensional scanning mirrors 12 and 13, in order to achieve two-dimensional scanning. However, use of such a large number of reflection surfaces causes attenuation of light due to reflection performed between the large number of surfaces, thus lowering the detection sensitivity.

BRIEF SUMMARY OF THE INVENTION

The present invention has been made to overcome the above disadvantages. An object of the invention is to provide a light scanning type compact confocal optical device, which has the view direction coincident with the insertion direction, thus improving the operability.

Another object of the invention is to provide a light scanning device, which allows realization of such a compact confocal optical system.

Still another object of the present invention is to provide a light scanning type confocal optical device or light scanning device, which has a small number of reflection surfaces, such that detection sensitivity is improved.

Additional objects and advantages of the invention will be set forth in the specification which follows, and in part will be obvious from the description, or may be learned by practice of the invention. The objects and advantages of the invention may be realized by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments below, serve to explain the principles of the invention.

FIG. 6 shows a light scanning type confocal optical device having a light scanning device, according to the second embodiment of the present invention.

FIG. 7 shows a light scanning type confocal optical device having a light scanning device, according to the third embodiment of the present invention.

FIG. 14 shows a light scanning type confocal optical device according to the sixth embodiment of the present invention.

FIGS. 15 to 17 shows some of the examples of the optical connection between an optical fiber applicable to the device shown in FIG. 14 and the movable mirror having the confocal pinhole.

DETAILED DESCRIPTION OF THE INVENTION

First Embodiment

Figure 1:
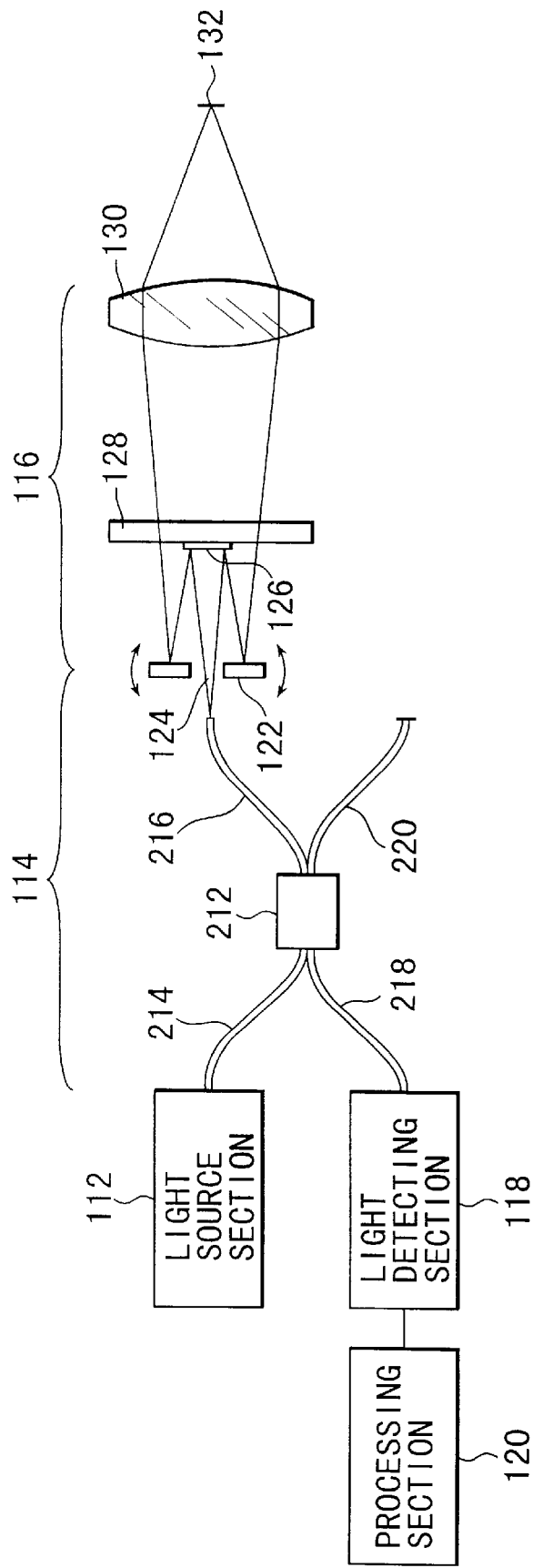
FIG. 1 shows a light scanning type confocal optical device having a light scanning device, according to the first embodiment of the present invention.

FIG. 1 shows a light scanning type confocal optical device having a light scanning device, according to the first embodiment of the present invention. Referring to FIG. 1, the optical device comprises a light source section 112, a light transmitting section 114, a light scanning section 116, a light detecting section 118, and a processing section 120.

The light source section 112 comprises, for example, a laser oscillator. The light transmitting section 114 comprises, for example, a four-terminal coupler 212 for sorting incident light and detected light, and four optical fibers 214, 216, 218 and 220 connected to the four-terminal coupler 212. The light scanning section 116 has a movable mirror 122, a fixed mirror 126 and a converging lens 130. The processing section 120 processes data on the basis of scanned information and data from the light detecting section 118.

The light source section 112 and the four-terminal coupler 212 are optically connected to each other by the optical fiber 214. The light scanning section 116 and the four-terminal coupler 212 are optically connected to each other by the optical fiber 216. The light detecting section 118 and the four-terminal coupler 212 are optically connected to each other by the optical fiber 218. The optical fiber 220 connected to the four-terminal coupler 212 has a free end, and is subjected to non-reflection processing.

The movable mirror 122 has a light transmission region, for example, an opening 124 at its center, and is supported to be swingable about at least one axis. The fixed mirror 126 is fixedly supported by an optically transparent plate 128, such as a glass plate. A reflection surface of the movable mirror 122 is located opposite to a reflection surface of the fixed mirror 126. Accordingly, the fixed mirror 126 reflects the light passing through the opening 124 toward the reflection surface of the movable mirror 122, and then the movable mirror 122 reflects the light reflected from the fixed mirror 126 toward the converging lens 130. The converging lens 130 converges the light transmitted from the movable mirror 122 through the plate 128 onto an object surface 132.

The optical fiber 216 is a step index type optical fiber having a core and a clad, more preferably, a single mode fiber having a small core diameter. The core of an end face of the optical fiber 216 is substantially regarded as a point light source. Furthermore, a confocal optical system is provided such that the core of the end face has a conjugate relationship with a focal point of the converging lens 130. The core of the end face substantially functions as a confocal pinhole in the confocal optical system.

The movable mirror 122 is supported in a manner varying in accordance with the scanning method required for measurement. For example, when scanning is one-dimensionally performed, the movable mirror 122 is supported to be swingable about one axis. In other words, it is swung about the axis to achieve one-dimensional scanning. When scanning is two-dimensionally performed, the movable mirror 122 is supported to be swingable about two perpendicular axes. In other words, it is swung about the axes to achieve two-dimensional scanning. Needless to say, it may be supported to be swingable about two axes, and swung about one of the axes to achieve one-dimensional scanning.

The light from the light source section 112 reaches the four-terminal coupler 212, and then the coupler 212 transmits half of the light to the light scanning section 116 through the optical fiber 216. The light from the optical fiber 216 passes through the opening 124, and is reflected by the fixed mirror 126 toward the reflection surface of the movable mirror 122. The light from the reflection surface of the movable mirror 122 is incident on the converging lens 130, and is then converged onto the object surface 132 due to a refracting function of the converging lens 130.

The light incident on the object surface 132 is reflected irregularly therefrom in accordance with the shape and reflectance, etc. of the object. Of the irregularly reflected light, the light incident onto the converging lens 130 is transmitted to the movable mirror 122, and reflected therefrom to the fixed mirror 126. Then, the light reflected from the fixed mirror 126 reaches the end face of the optical fiber 216. In other words, part of the light reflected from the object surface 132 strikes on and passes through the converging lens 130, and the light passed through the lens travels to the end face of the optical fiber 216, after being reflected by the movable mirror 122 and then by the fixed mirror 216 and passing through the opening 214, while being converged by a refracting function of the converging lens 130.

The light returned from the light scanning section 116 is transmitted from the end face of the optical fiber 216 to the core thereof, and then reaches the four-coupler 212 through the optical fiber 216. The coupler 212 transmits half of the light to the light detecting section 118 through the optical fiber 218. The light detecting section 118 detects information of the light, such as the wavelength or intensity of the light, and sends the information to the processing section 120. The processing section 120 processes the information along with driving data of the movable mirror 122, to thereby obtain data such as the intensity of detected light at respective positions of the object surface 132.

Needless to say, the structure of the confocal optical device according to the first embodiment may be modified variously. For example, in the above-mentioned structure, optical scanning is achieved due to swinging of the mirror 122. However, such a structure may be modified as follows: the mirror 122 is fixed, and the mirror 126 is swung in order to perform optical scanning. Alternatively, both the mirrors 122 and 126 may be swingably supported, and swung about perpendicular axes to achieve two-dimensional scanning.

According to the first embodiment, when the confocal optical device is inserted into the living body through the endoscope, the insertion direction of the device accords with the view direction of the confocal optical system, in which the inside of the living body is viewed with the system. Therefore, the light scanning section 116 can be easily and accurately moved in a direction perpendicular to the object surface 132.

Furthermore, in the first embodiment, the number of reflection surfaces is only two. In other words, only the movable mirror 122 and fixed mirror 126 have reflection surfaces. Accordingly, the degree of the attenuation of light which occurs due to reflection is small, and thus lowering of the detection sensitivity can be greatly restricted.

Driving Mirror

Next, a driving mirror, which may be applied for the above mentioned confocal optical device, will be explained. It is a specific structural unit, and includes the movable mirror 122. To be more specific, in this specification, the driving mirror means a functional unit or a device including a movable mirror capable of being swung and driving means for swinging the movable mirror.

Figure 2:
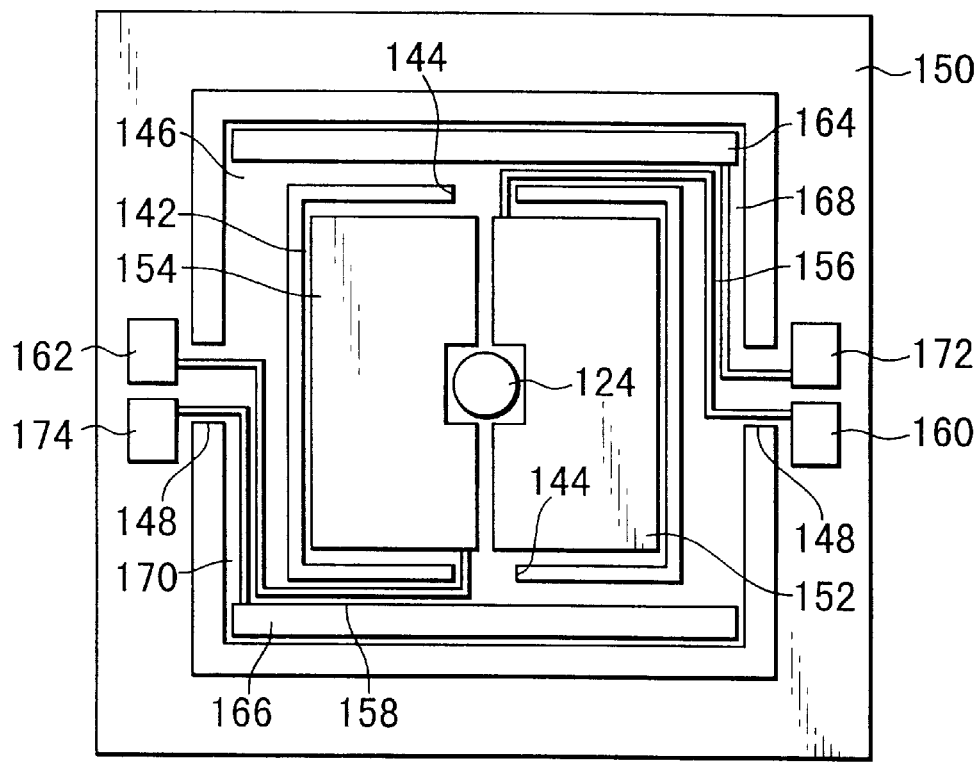
FIG. 2 shows an electrostatically driven scan mirror with a gimbal structure, which may be applied to the device shown in FIG. 1, so as to enable the device to scan light two-dimensionally.

FIG. 2 shows an electrostatically driven scan mirror for scanning light two-dimensionally, which is applied to the confocal optical device according to the first embodiment.

In the driving mirror, a reflection surface-holding portion 142 is supported by a pair of torsion bars 144 connected to an inner frame 146, and the inner frame 146 is supported by a pair of torsion bars 148 connected to an outer frame 150. The pair of torsion bars 144 and the pair of torsion bar 148 can be elastically twisted about their perpendicular axes. Due to this structure, the reflection surface holding portion 142 can be swung about the axis of the pair of torsion bars 144 relative to the inner frame 146, and also swung about the axis of the pair of torsion bars 148 relative to the outer frame 150.

The reflection surface holding portion 142 has the opening 124 in the center, and a +X electrode 152 and a −X electrode 154, each functioning as an optical reflection surface, are formed on the sides of the opening 124. The electrodes 152 and 154 are connected to electrodes 160 and 162 by wiring patterns 156 and 158 extending on the inner frame 146, respectively. On the inner frame 146, a +Y electrode 164 and a −Y electrode 166 are formed, and connected to electrodes 172 and 174 by wiring patterns 168 and 170, respectively.

Furthermore, the above structural unit is provided with one ground electrode (not shown) which is located opposite to the +X electrode 152, the −X electrode 154, the +Y electrode 164 and the −Y electrode 166.

When a voltage is applied between the +X electrode 152 and the ground electrode, an electrostatic force generates which has a value proportional to the absolute value of the applied voltage, and the +X electrode 152 is attracted toward the ground electrode. Similarly, when a voltage is applied between the −X electrode 154 and the ground electrode, the −X electrode 152 is attracted toward the ground electrode by a generated electrostatic force having a value proportional to the absolute value of the applied voltage. Accordingly, when voltages having different values (different absolute values) are applied to the +X electrode 152 and the −X electrode 154, respectively, the reflection surface-holding portion 142 is twisted about the axis of the pair of torsion bars 144 (referred to as a Y axis in the first embodiment), and the reflection surface (the +X electrode 152 and −X electrode 154) is deflected about the Y axis.

Therefore, the reflection surface (the +X electrode 152 and the −X electrode 154) is periodically swung about the Y axis, and the light reflected from the reflection surface is scanned in a reciprocating manner along the axis of the pair of torsion bars 148 (which is referred to as an X axis), when alternating voltages which have opposite phases with a minimum voltage of 0V are applied to the +X electrode 152 and the −X electrode 154, respectively. For example, the above is achieved, when an alternating voltage, which is represented by a solid line in FIG. 3, is applied to the +X electrode 152, and an alternating voltage, which is represented by a broken line in FIG. 3, is applied to the −X electrode 154.

Similarly, voltages having different values are applied to the +Y electrode 164 and the −Y electrode, respectively, to thereby swing the reflection surface holding portion 142 about the X axis. As a result, the reflection surface (the +X electrode 152 and the −X electrode 154) is deflected about the X axis, and the light reflected from the reflection surface is scanned along the Y axis.

Figure 3:
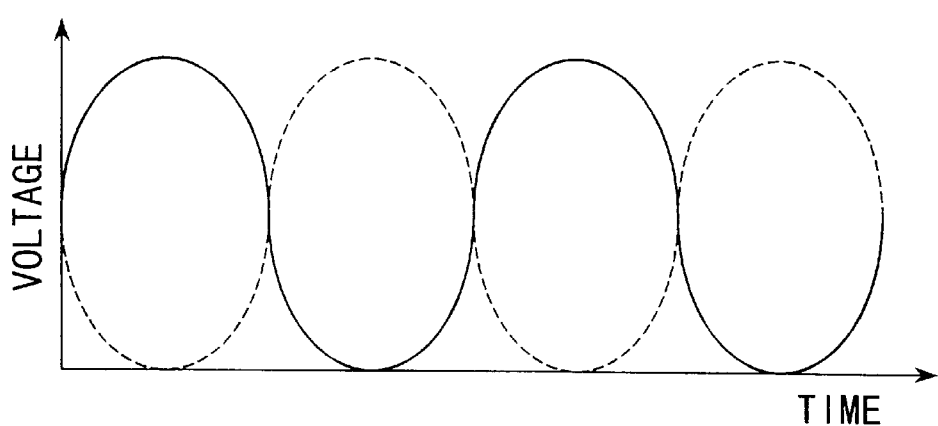
FIG. 3 shows waveforms of voltages for swinging the driving mirror of FIG. 2.

Therefore, the light reflected from the reflection surface (the +X electrode 152 and the −X electrode 154) is two-dimensionally scanned (for example, raster-scanned), by applying voltages having opposite phases and varying periodically as shown FIG. 3 to the +X electrode 152 and the −X electrode 154, and applying voltages, which have opposite phases and vary in a linear fashion over time, to the +Y electrode 164 and the −Y electrode 166.

Next, an electrostatically driven scan mirror for scanning light one-dimensionally will be explained with reference to FIG. 4, which may be applied to the confocal optical device according to the first embodiment, instead of the driving mirror of FIG. 2.

Figure 4:
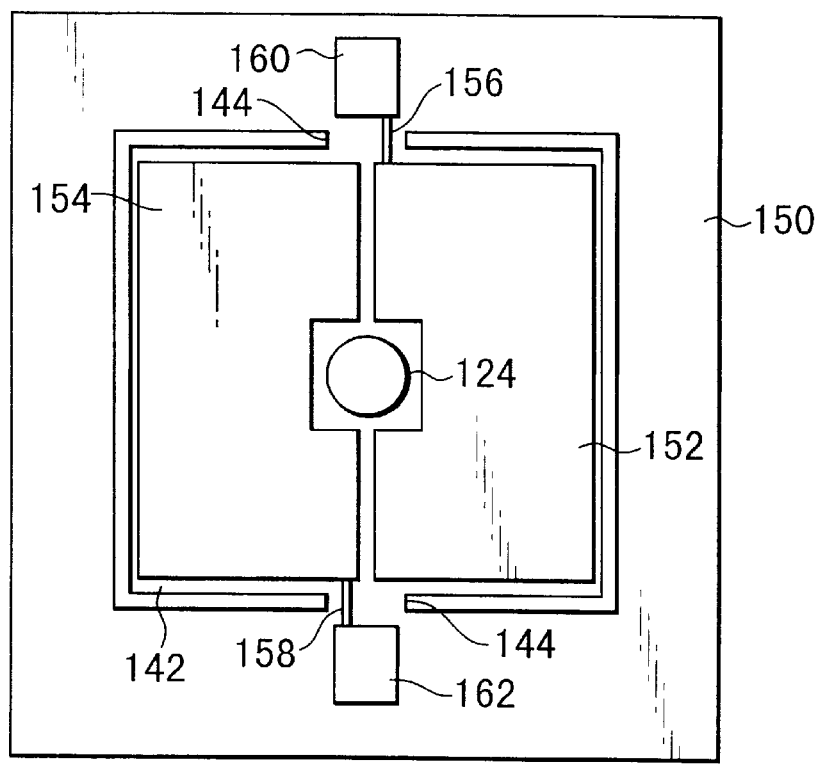
FIG. 4 shows an electrostatically driven scan mirror, which may be applied to the device shown in FIG. 1, so as to enable the device to scan light one-dimensionally.

The driving mirror shown in FIG. 4 is a structural unit having one swinging function, whereas the driving mirror in FIG. 2 has two swinging functions. In other words, it has a similar structure to that of FIG. 2, apart from that it does not include the inner frame 146 of the driving mirror of FIG. 2.

More specifically, the reflection holding portion 142 is supported by the pair of torsion bars 144 connected to the outer frame 150, which can be elastically twisted about the axis of the pair. Due to this structure, it can be swung about the axis of the pair relative to the outer frame 150.

The reflection surface holding portion 142 has the opening 124 in the center, and the +X electrode 152 and the −X electrode 154, each functioning as an optical reflection surface, are formed on the sides of the opening 124. The electrodes 152 and 154 are connected to the electrodes 160 and 162 by the wiring patterns 156 and 158. In addition, one ground electrode (not shown) is provided opposite to the +X electrode 152 and the −X electrode 154.

The reflection surface (the +X electrode 152 and the −X electrode 154) is periodically swung about the Y axis, and the light reflected from the reflection surface is scanned along the X axis in a reciprocating manner.

Figure 5:
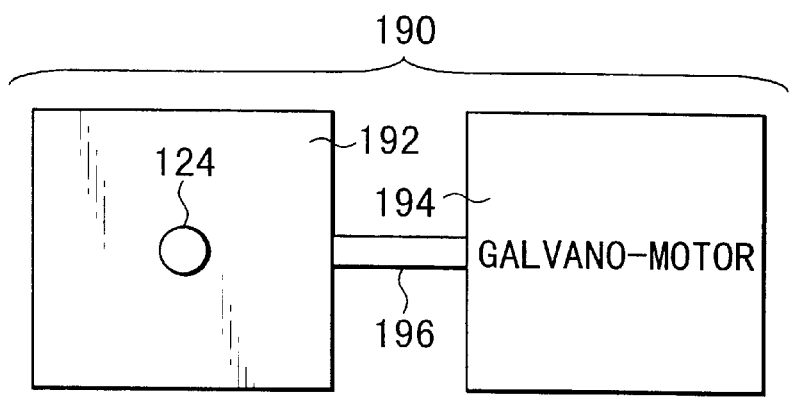
FIG. 5 shows a galvano-mirror, which may be applied to the device shown in FIG. 1, so as to enable the device to scan light one-dimensionally.

A galvano-mirror, which is well known as a driving mirror for scanning light one-dimensionally, will be explained with reference to FIG. 5 and may be applied to the confocal optical device according to the first embodiment.

A galvano-mirror 190 has a reflecting member 192 which has an opening 124 formed in its center, and which is fixed to a shaft of a galvano-motor 194. The galvano-mirror 190 is the same as a well known general galvano-mirror, with the exception of the following feature: the opening 124 is formed in the center of the reflecting member 192.

Accordingly, the reflecting member 192 is swung around the shaft 196 by the galvano-motor 194 as in the general galvano-mirror, whereby reflected light is scanned in a reciprocating manner in an imaginary plane perpendicular to the shaft 196.

Second Embodiment

FIG. 6 shows a light scanning type confocal optical device having a light scanning device, according to the second embodiment.

In FIG. 6, identical structural elements to those in FIG. 1 are denoted by the same reference numerals, and their explanations will be omitted. The scanning section 116 of the second embodiment differs in structure from the optical scanning section 116 of the first embodiment. The other structural elements are completely the same as those of the first embodiment. Accordingly, their operations are also the same.

The optical scanning section 116 has a movable mirror 122, a fixed mirror 126 and a converging lens 130. The converging lens 130 is a plano-convex lens, and the fixed mirror 126 is provided on a flat surface of the converging lens 130. The fixed mirror 126 is formed of a metal film. To be more specific, a metal film is selectively formed on the flat surface of the converging lens 130 by, for example, deposition, thereby forming the fixed mirror 126.

The reflection surface of the movable mirror 122 is located opposite to that of the fixed mirror 126. The fixed mirror 126 reflects the light passing through the opening 124 toward the reflection surface of the movable mirror 122, and the movable mirror 122 reflects the light from the fixed mirror 126 toward the converging lens 130. The converging lens 130 converges the light from the movable mirror 122 onto the object surface 132.

The confocal optical device of the second embodiment has a smaller number of structural elements than the confocal optical device of the first embodiment. In this regard, it is advantageous.

Third Embodiment

FIG. 7 shows a light scanning type confocal optical device having a light scanning device, according to the third embodiment.

In FIG. 7, identical structural elements to those in FIG. 1 are denoted by identical reference numerals, and their explanation will be omitted. The confocal optical device of the third embodiment are completely the same as the confocal optical device of the second embodiment, except for the position of the core of the end face of the optical fiber 216, which functions as a confocal pinhole. Therefore, its operation is also the same.

More specifically, according to the third embodiment, the optical fiber 216 extends through the opening 124 of the movable mirror 122, and the core of the end face of the optical fiber 216, which as mentioned above, serves as the confocal pinhole, is located between the movable mirror 122 and the fixed mirror 126.

The reflection surface of the movable mirror 122 is opposite to that of the fixed mirror 126. The fixed mirror 126 reflects the light emitted from the optical fiber 216 toward the reflection surface of the movable mirror 122, and the movable mirror 122 reflects the light from the fixed mirror 126 toward the converging lens 130. The converging lens 130 converges the light from the movable mirror 122 onto the object surface 132.

By virtue of the above structure, in the optical device of the third embodiment, there is no possibility that the light emitted from the optical fiber 216 may be incident on and returned by some portion of the opening 124. In this regard, the optical device of the third embodiment is advantageous.

Fourth Embodiment

Figure 8:
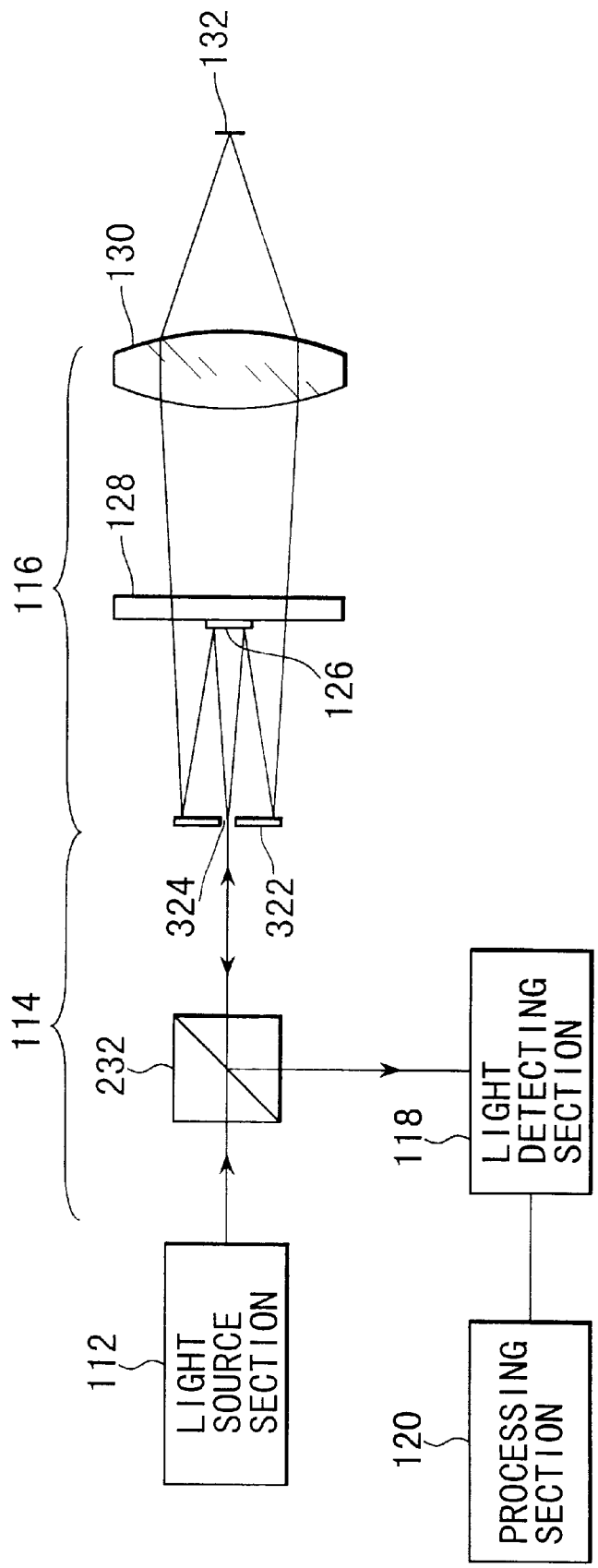
FIG. 8 shows a light scanning type confocal optical device having a light scanning device, according to the fourth embodiment of the present invention.

FIG. 8 shows a light scanning type confocal optical device having a light scanning device, according to the fourth embodiment of the present invention. Referring to FIG. 8, the optical device comprises a light source section 112, a light transmitting section 114, a light scanning section 116, a light detecting section 118, and a processing section 120.

The light source section 112 comprises, for example, a laser oscillator. The light transmitting section 114 comprises, for example, a beam splitter 232 for sorting incident light and detected light. The light scanning section 116 has a movable mirror with a confocal pinhole 322 (hereinafter referred to simply as a confocal movable mirror 322), a fixed mirror 126 and a converging lens 130. The processing section 120 and processes data on the basis of scanned information and data from the light detecting section 118.

The confocal movable mirror 322 has a confocal pinhole 324 at its center, and is supported to be swingable about at least one axis. The fixed mirror 126 is fixedly supported by an optically transparent plate 128, such as a glass plate. A reflection surface of the confocal movable mirror 322 is located opposite to a reflection surface of the fixed mirror 126. Accordingly, the fixed mirror 126 reflects the light passing through the confocal pinhole 324 toward the reflection surface of the confocal movable mirror 322, and then the confocal movable mirror 322 reflects the light reflected from the fixed mirror 326 toward the converging lens 130. The converging lens 130 converges the light transmitted from the confocal movable mirror 322 through the plate 128 onto an object surface 132.

The confocal movable mirror 322 is supported in a manner varying in accordance with the scanning method required for measurement. For example, when scanning is one-dimensionally performed, the confocal movable mirror 322 is supported to be swingable about one axis. In other words, it is swung about the axis to achieve one-dimensional scanning. When scanning is two-dimensionally performed, the confocal movable mirror 322 is supported to be swingable about two perpendicular axes. In other words, it is swung about the axes to achieve two-dimensional scanning. Needless to say, it may be supported to be swingable about two axes, and swung about one of the axes to achieve one-dimensional scanning.

The light from the light source section 112 passes through the beam splitter 232 and then is made incident on the confocal movable mirror 322. The light having passed through the confocal pinhole 324 of the confocal movable mirror 322 is reflected by the fixed mirror 126 toward the reflection surface of the confocal movable mirror 322. The light from the reflection surface of the confocal movable mirror 322 is incident on the converging lens 130, and is then converged onto the object surface 132 due to a refracting function of the converging lens 130.

The light incident on the object surface 132 is reflected irregularly therefrom in accordance with the shape and reflectance, etc. of the object. Of the irregularly reflected light, the light incident onto the converging lens 130 is transmitted to the confocal movable mirror 322, and reflected therefrom to the fixed mirror 126. Then, the light reflected from the fixed mirror 126 reaches the confocal pinhole 322. In other words, part of the light reflected from the object surface 332 strikes on and passes through the converging lens 130, and the light passed through the lens travels while being converged by a refracting function of the converging lens 130, to the confocal movable mirror 322. The light, after being reflected by the confocal movable mirror 322, reaches the fixed mirror 216 and the light reflected by the fixed mirror 126 reaches the confocal pinhole 324.

The light having passed through the confocal pinhole 324, which is returned from the light scanning section 116, is reflected by the beam splitter 232 of the light transmitting section 114 to reach the light detecting section 118. The light detecting section 118 detects information of the light, such as the wavelength or intensity of the light, and sends the information to the processing section 120. The processing section 120 processes the information along with driving data of the confocal movable mirror 322, to thereby obtain data such as the intensity of detected light at respective positions of the object surface 132.

Needless to say, the structure of the confocal optical device according to the present embodiment may be modified variously. For example, in the above-mentioned structure, the light scanning section 116 comprises the swingably supported mirror 322 having the confocal pinhole, and the fixedly supported mirror 126. However, such a structure may be modified as follows: the mirror 322 having the confocal pinhole is fixed, and the mirror 126 is supported to be swingable. Alternatively, both the mirrors 322 and 126 may be swingably supported, and swung about axes directed in different directions, to achieve two-dimensional scanning.

Driving Mirror With Confocal Pinhole

Next, a driving mirror with a confocal pinhole, hereinafter referred to simply as a confocal driving mirror, which may be applied for the above mentioned confocal optical device, will be explained. It is a specific structural unit, and includes the confocal movable mirror 322. To be more specific, in this specification, the confocal driving mirror means a functional unit or a device including a confocal movable mirror capable of being swung and driving means for swinging the confocal movable mirror.

Figure 9:
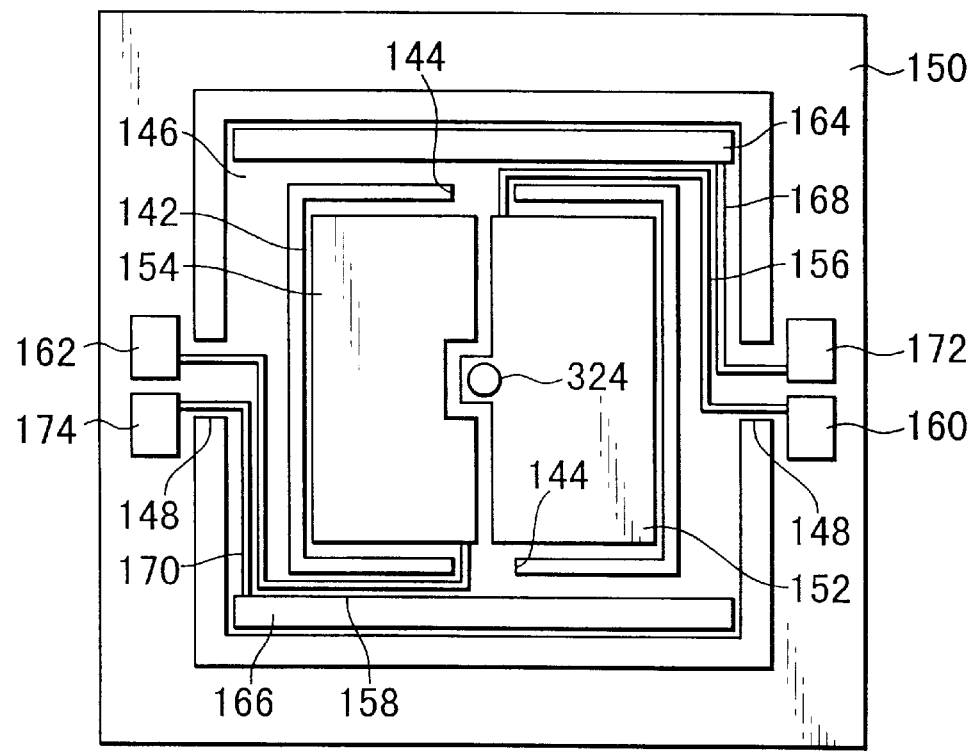
FIG. 9 shows an electrostatically driven scan mirror with a gimbal structure, which may be applied to the movable mirror having a confocal pinhole, shown in FIG. 8, so as to enable the device to scan light two-dimensionally.

FIG. 9 shows an electrostatically driving type confocal driving mirror for scanning light two-dimensionally, which is applied to the confocal optical device according to the first embodiment.

In the confocal driving mirror, a reflection surface-holding portion 142 is supported by a pair of torsion bars 144 connected to an inner frame 146, and the inner frame 146 is supported by a pair of torsion bars 148 connected to an outer frame 150. The pair of torsion bars 144 and the pair of torsion bar 148 can be elastically twisted about their perpendicular axes. Due to this structure, the reflection surface holding portion 142 can be swung about the axis of the pair of torsion bars 144 relative to the inner frame 146, and also swung about the axis of the pair of torsion bars 148 relative to the outer frame 150.

On the reflection surface holding portion 142, a +X electrode 152 and a −X electrode 154 are formed, functioning as an optical reflection surface. The electrodes 152 and 154 are connected to electrodes 160 and 162 by wiring patterns 156 and 158 extending on the inner frame 146, respectively. On the inner frame 146, a +Y electrode 164 and a −Y electrode 166 are formed, and connected to electrodes 172 and 174 by wiring patterns 168 and 170, respectively.

The confocal pinhole 324 is made at the center of the reflection surface-holding portion 142, and the pinhole 324 has a diameter of, for example, 1 μm, which corresponds to the limit of the diffraction of the returned light, or less. It is preferable that the confocal pinhole 324 should be formed at a high accuracy, and therefore should have a sharp edge. For this purpose, the electrode 152 extends out to the central section of the reflection surface-holding portion 14, where the confocal pinhole 324 is formed, and the outline of the confocal pinhole 324 is given by a hole made in the electrode 152.

In general, a structure of this type is manufactured by a micro-machining technique to which the semiconductor manufacturing technique is applied. More specifically, a silicon nitride film is deposited on a silicon member, and then patterned into a gimbal shape. Next, a metal film made of aluminum or the like, is formed into an electrode and wiring. Lastly, with use of a silicon nitride film as a mask, the silicon member is processed into a gimbal structure. Since the metal which constitutes the electrode and wiring is exposed to etchant, a metal having a resistance to the wet-etchant is selected for use. The process by the wet etchant is carried out in an isotropic manner. Therefore, after the process, the hinge portion is covered only with the silicon nitride film, and therefore it can be easily rotated.

The confocal pinhole 324 is made by, for example, anisotropic etching. In particular, the anisotropic etching for a metal film can achieve a very high processing accuracy, and therefore the confocal pinhole 324 is formed at a very high accuracy. From a different point view, as can be understood from the manufacturing process described above, the reflection surface-holding portion 142 is made mainly of the silicon member, and it is difficult to make a pinhole having a very small diameter at a high accuracy in the silicon member. In order to avoid the difficulty of making a confocal pinhole 324, the electrode 152 is extended to the central portion of the reflection surface-holding portion 142, and a hole is then made at the center of the portion.

Furthermore, the above structural unit is provided with one ground electrode (not shown) which is located opposite to the +X electrode 152, the −X electrode 154, the +Y electrode 164 and the −Y electrode 166.

When a voltage is applied between the +X electrode 152 and the ground electrode, an electrostatic force generates which has a value proportional to the absolute value of the applied voltage, and the +X electrode 152 is attracted toward the ground electrode. Similarly, when a voltage is applied between the −X electrode 154 and the ground electrode, the −X electrode 152 is attracted toward the ground electrode by a generated electrostatic force having a value proportional to the absolute value of the applied voltage. Accordingly, when voltages having different values (different absolute values) are applied to the +X electrode 152 and the −X electrode 154, respectively, the reflection surface-holding portion 142 is twisted about the axis of the pair of torsion bars 144 (referred to as a Y axis in the first embodiment), and the reflection surface (the +X electrode 152 and −X electrode 154) is deflected about the Y axis.

Therefore, the reflection surface (the +X electrode 152 and the −X electrode 154) is periodically swung about the Y axis, and the light reflected from the reflection surface is scanned in a reciprocating manner along the axis of the pair of torsion bars 148 (which is referred to as an X axis), when alternating voltages which have opposite phases with a minimum voltage of 0V are applied to the +X electrode 152 and the −X electrode 154, respectively. For example, the above is achieved, when an alternating voltage, which is represented by a solid line in FIG. 10, is applied to the +X electrode 152, and an alternating voltage, which is represented by a broken line in FIG. 10, is applied to the −X electrode 154.

Similarly, voltages having different values are applied to the +Y electrode 164 and the −Y electrode, respectively, to thereby swing the reflection surface holding portion 142 about the X axis. As a result, the reflection surface (the +X electrode 152 and the −X electrode 154) is deflected about the X axis, and the light reflected from the reflection surface is scanned along the Y axis.

Figure 10:
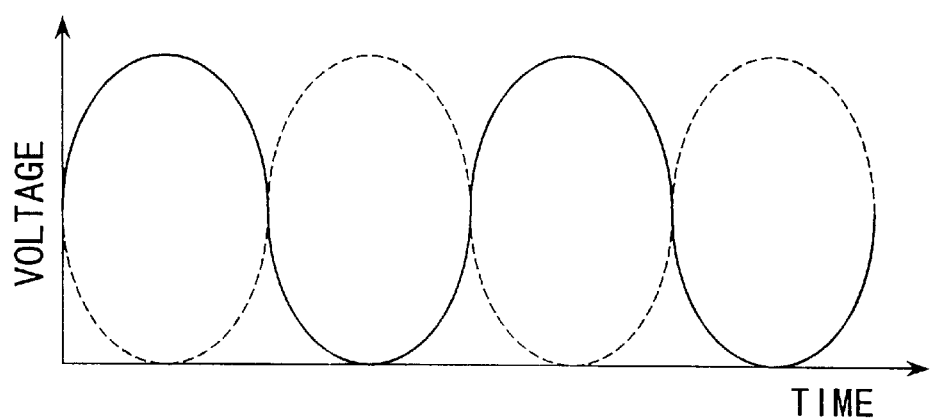
FIG. 10 shows waveforms of voltages for swinging the driving mirror having a gimbal structure, shown in FIG. 9.

Therefore, the light reflected from the reflection surface (the +X electrode 152 and the −X electrode 154) is two-dimensionally scanned (for example, raster-scanned), by applying voltages having opposite phases and varying periodically as shown FIG. 10 to the +X electrode 152 and the −X electrode 154, and applying voltages, which have opposite phases and vary in a linear fashion over time, to the +Y electrode 164 and the −Y electrode 166.

Next, an electrostatically driving type confocal driving mirror for scanning light one-dimensionally will be explained with reference to FIG. 11, which may be applied to the confocal optical device according to the first embodiment, instead of the confocal driving mirror of FIG. 9.

Figure 11:
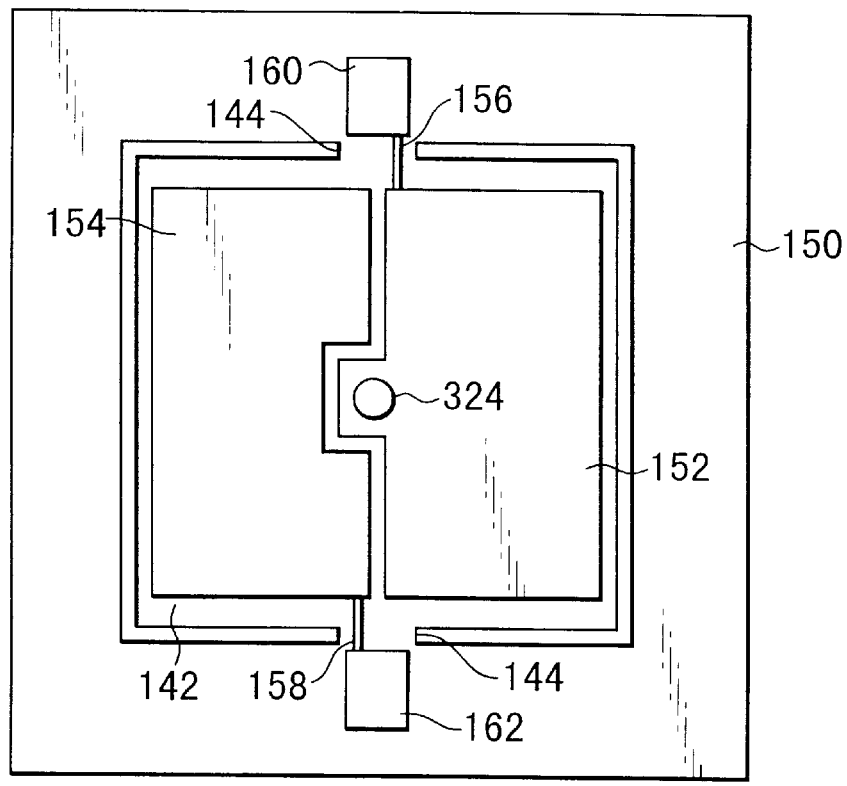
FIG. 11 shows an electrostatically driven scan mirror, which may be applied to the movable mirror having a confocal pinhole, shown in FIG. 8, so as to enable the device to scan light one-dimensionally.

The confocal driving mirror shown in FIG. 11 is a structural unit having one swinging function, whereas the confocal driving mirror in FIG. 9 has two swinging functions. In other words, it has a similar structure to that of FIG. 9, apart from that it does not include the inner frame 146 of the confocal driving mirror of FIG. 9.

More specifically, the reflection holding portion 142 is supported by the pair of torsion bars 144 connected to the outer frame 150, which can be elastically twisted about the axis of the pair. Due to this structure, it can be swung about the axis of the pair relative to the outer frame 150.

The reflection surface holding portion 142 has the confocal pinhole 324 in the center, and the +X electrode 152 and the −X electrode 154, each functioning as an optical reflection surface, are formed on the sides of the confocal pinhole 324. The electrodes 152 and 154 are connected to the electrodes 160 and 162 by the wiring patterns 156 and 158. In addition, one ground electrode (not shown) is provided opposite to the +X electrode 152 and the −X electrode 154.

The reflection surface (the +X electrode 152 and the −X electrode 154) is periodically swung about the Y axis, and the light reflected from the reflection surface is scanned along the X axis in a reciprocating manner.

Figure 12:
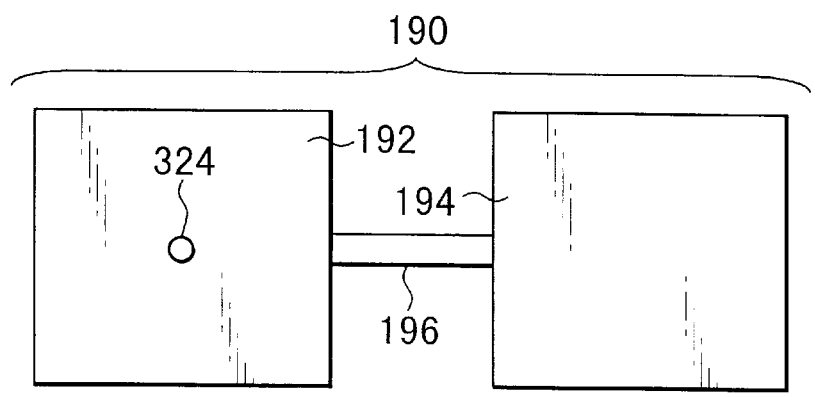
FIG. 12 shows a galvano-mirror, which may be applied to the movable mirror having a confocal pinhole, shown in FIG. 8, so as to enable the device to scan light one-dimensionally.

A galvano-mirror, which is well known as a confocal driving mirror for scanning light one-dimensionally, will be explained with reference to FIG. 12 and may be applied to the confocal optical device according to the first embodiment.

A galvano-mirror 190 has a reflecting member 192 which has an confocal pinhole 324 formed in its center, and which is fixed to a shaft of a galvano-motor 194. The galvano-mirror 190 is the same as a well known general galvano-mirror, with the exception of the following feature: the confocal pinhole 324 is formed in the center of the reflecting member 192. Accordingly, the reflecting member 192 is swung around the shaft 196 by the galvano-motor 194 as in the general galvano-mirror, whereby reflected light is scanned in a reciprocating manner in an imaginary plane perpendicular to the shaft 196.

Fifth Embodiment

Figure 13:
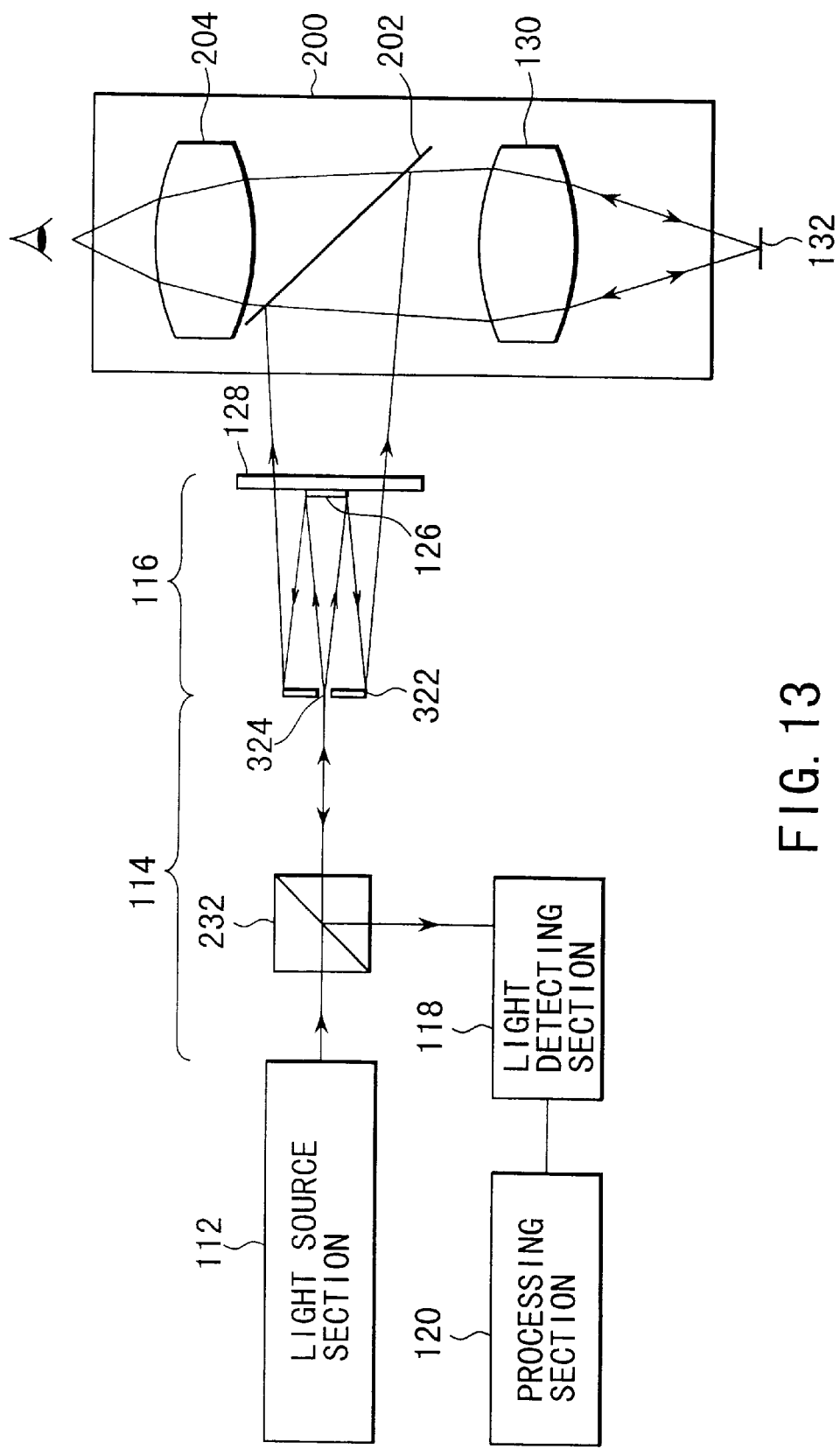
FIG. 13 shows a light scanning type confocal optical device according to the fifth embodiment of the present invention.

FIG. 13 shows a light scanning type confocal optical device having a light scanning device, according to the fifth embodiment of the present invention. The light scanning type confocal optical device of the present embodiment is of a side viewing type, and is made appropriate to be combined with an optical microscope such as a biological microscope. FIG. 13 shows a structure in which the invention is combined with a biological microscope or the like.

Referring to FIG. 13, the optical device basically comprises a light source section 112, a light transmitting section 114, a light scanning section 116, and a processing section 120.

The light source section 112 comprises, for example, a laser oscillator. The light transmitting section 114 comprises, for example, a beam splitter 232 for sorting incident light and detected light. The light scanning section 116 has a confocal movable mirror 322, a fixed mirror 126, a beam splitter 202 and a converging lens 130. The processing section 120 processes data on the basis of scanned information and data from the light detecting section 118.

The beam splitter 202 and the converging lens 130, together with a lens 204, constitute an optical microscope 200 for visually observing an object surface 132. The beam splitter 202 comprises a half mirror or a dichroic mirror or the like. The lens 204 converges the light made incident from the object surface 132 through the converging lens 130 and the beam splitter 202, so as to form an image, thus making it possible for an observer to observe the object surface 132 under the microscope.

The confocal movable mirror 322 has a confocal pinhole 324 at its center, and is supported to be swingable about at least one axis. The fixed mirror 126 is fixedly supported by an optically transparent plate 128, such as a glass plate. A reflection surface of the confocal movable mirror 322 is located opposite to a reflection surface of the fixed mirror 126. Accordingly, the fixed mirror 126 reflects the light passing through the confocal pinhole 324 toward the reflection surface of the confocal movable mirror 322, and then the confocal movable mirror 322 reflects the light reflected from the fixed mirror 126 toward the beam splitter 202. The beam splitter 202 reflects the light from the confocal movable mirror 322 towards the converging lens 130, which converges the light transmitted from the confocal movable mirror 322 onto an object surface 132.

The confocal movable mirror 322 is supported in a manner varying in accordance with the scanning method required for measurement. For example, when scanning is one-dimensionally performed, the confocal movable mirror 322 is supported to be swingable about one axis. In other words, it is swung about the axis to achieve one-dimensional scanning. When scanning is two-dimensionally performed, the confocal movable mirror 322 is supported to be swingable about two perpendicular axes. In other words, it is swung about the axes to achieve two-dimensional scanning. Needless to say, it may be supported to be swingable about two axes, and swung about one of the axes to achieve one-dimensional scanning.

The light from the light source section 112 passes through the beam splitter 232 and then is made incident on the confocal movable mirror 322. The light having passed through the confocal pinhole 324 of the confocal movable mirror 322 is reflected by the fixed mirror 126 toward the reflection surface of the confocal movable mirror 322. The light reflected from the reflection surface of the confocal movable mirror 322, after being deflected by the beam splitter 202, is incident on the converging lens 130, and is then converged onto the object surface 132 due to a refracting function of the converging lens 130.

The light incident on the object surface 132 is reflected irregularly therefrom in accordance with the shape and reflectance, etc. of the object. Of the irregularly reflected light, the light incident onto the converging lens 130 is deflected by the beam splitter 202, and then reflected by the confocal movable mirror 322 and the fixed mirror 126 in order, to reach the confocal pinhole 324. In other words, part of the light reflected from the object surface 132 strikes on and passes through the converging lens 130, and the light passed through the lens travels while being converged by a refracting function of the converging lens 130, to the confocal movable mirror 322. The light, after being reflected by the confocal movable mirror 322, reaches the fixed mirror 126 and the light reflected by the fixed mirror 126 reaches the confocal pinhole 324.

The light having passed through the confocal pinhole 324, which is returned from the light scanning section 116, is reflected by the beam splitter 232 of the light transmitting section 114 to reach the light detecting section 118. The light detecting section 118 detects information of the light, such as the wavelength or intensity of the light, and sends the information to the processing section 120. The processing section 120 processes the information along with driving data of the confocal movable mirror 322, to thereby obtain data such as the intensity of detected light at respective positions of the object surface 132.

Needless to say, the structure of the confocal optical device according to the present embodiment may be modified variously. For example, in the above-mentioned structure, the light scanning section 116 comprises the swingably supported mirror 322 having the confocal pinhole, the fixedly supported mirror 126, and the beam splitter 202. However, such a structure may be modified as follows: the mirror 322 having the confocal pinhole is fixed, and the mirror 126 or the beam splitter 202 is supported to be swingable.

That is, one-dimensional scanning can be performed by swinging the mirror 322 having the confocal pinhole, and either one of the mirror 126 and the beam splitter 202. Alternatively, any two of the mirror 322 having the confocal pinhole, the mirror 126 and the beam splitter 202 may be swingably supported, and swung about axes directed in different directions, to achieve two-dimensional scanning.

Sixth Embodiment

FIG. 14 shows a light scanning type confocal optical device having a light scanning device, according to the sixth embodiment of the present invention. The present embodiment has a structure in which the light source section, the light scanning section and the light detecting section are optically connected with each other via optical fibers.

Referring to FIG. 14, the light scanning type confocal optical device basically comprises a light source section 112, a light transmitting section 114, a light scanning section 116, and a processing section 120.

The light source section 112 comprises, for example, a laser oscillator. The light transmitting section 114 comprises, for example, a four-terminal coupler 212 for sorting incident light and detected light, and four optical fibers 214, 216, 218 and 220. The light scanning section 116 has a confocal movable mirror 322, a fixed mirror 126, and a converging lens 130. The processing section 120 processes data on the basis of scanned information and data from the light detecting section 118.

The light source section 112 and the four-terminal coupler 212 are optically coupled to each other via the optical fiber 214, the light scanning section 116 and the four-terminal coupler 212 are optically coupled to each other via the optical fiber 216, and the light detecting section 118 and the four-terminal coupler 212 are optically coupled to each other via the optical fiber 218. Further, the free end of the optical fiber 220 connected to the four-terminal coupler 212 has been treated to be non-reflective.

The confocal movable mirror 322 has a confocal pinhole 324 at its center, and is supported to be swingable about at least one axis. The fixed mirror 126 is fixedly supported by an optically transparent plate 128, such as a glass plate. A reflection surface of the confocal movable mirror 322 is located opposite to a reflection surface of the fixed mirror 126. Accordingly, the fixed mirror 126 reflects the light passing through the confocal pinhole 324 toward the reflection surface of the confocal movable mirror 322, and then the confocal movable mirror 322 reflects the light reflected from the fixed mirror 126 toward the converging lens 130. The converging lens 130 converges the light transmitted from the confocal movable mirror 322 onto an object surface 132.

The confocal movable mirror 322 is supported in a manner varying in accordance with the scanning method required for measurement. For example, when scanning is one-dimensionally performed, the confocal movable mirror 322 is supported to be swingable about one axis. In other words, it is swung about the axis to achieve one-dimensional scanning. When scanning is two-dimensionally performed, the confocal movable mirror 322 is supported to be swingable about two perpendicular axes. In other words, it is swung about the axes to achieve two-dimensional scanning. Needless to say, it may be supported to be swingable about two axes, and swung about one of the axes to achieve one-dimensional scanning.

FIGS. 15 to 17 show examples of the connection between the optical fiber 216 and the confocal movable mirror 322. In the structure shown in FIG. 15, an end portion of the optical fiber 216 is fixed to the confocal movable mirror 322. In the structures shown in FIGS. 16 and 17, an end portion of the optical fiber 216 is situated close to the confocal movable mirror 322, and a tapered section 222 is made in the confocal movable mirror 322 so as to suppress the variation of the relative position setting between the end surface of the optical fiber 216 and the confocal pinhole 324, which might occur as the fiber is inclined with respect to the mirror. Particularly, in the case shown in FIG. 16, a micro-lens 224 is provided on the end surface of the optical fiber 216 such as to suppress the diffusion of the light output from the optical fiber 216.

The structure shown in FIG. 15 has an advantage that the relative positions of the end surface of the optical fiber 216 and the confocal pinhole 324 with each other do not vary even due to an external factor. At the same time, since the optical fiber 216 is set to the confocal movable mirror 322, a large force is required to drive the confocal movable mirror 322 as compared to the structures of FIGS. 16 and 17. For this reason, it is considered that the structure of FIG. 15 is appropriate to be applied to a large-sized structure.

The structures shown in FIGS. 16 and 17 have an advantage that a small force is sufficient to drive the confocal movable mirror 322 since the end portion of the optical fiber 216 and the confocal movable mirror 322 are not in contact. For this reason, it is considered that the structures of FIGS. 16 and 17 are appropriate to be applied to a very fine structure which is prepared by, for example, the micro-machine technique. The selection between the structures shown in FIGS. 16 and 17 may be made in consideration of the performance (S/N between resolution and detected signal) and cost. In the case where the performance is more important, the structure of FIG. 16 should be selected, whereas in the case where the cost is more important, the structure of FIG. 17 should be selected.

Referring again to FIG. 14, the light from the light source section 112 travels in through the optical fiber 214 to the four-terminal coupler 212, and a half of the light travels in through the optical fiber 216 by means of the four-terminal coupler 212, to reach the light scanning section 116. The light output from the optical fiber 216 passes through the confocal pinhole 324 of the confocal movable mirror 322, and then is reflected by the fixed mirror 126 toward the reflection surface of the confocal movable mirror 322. The light reflected from the reflection surface of the confocal movable mirror 322 is incident on the converging lens 130, and is then converged onto the object surface 132 due to a refracting function of the converging lens 130.

The light incident on the object surface 132 is reflected irregularly therefrom in accordance with the shape and reflectance, etc. of the object. Of the irregularly reflected light, the light incident onto the converging lens 130 is reflected by the confocal movable mirror 322 and then the fixed mirror 126 in order, to reach the confocal pinhole 324. In other words, part of the light reflected from the object surface 132 strikes on and passes through the converging lens 130, and the light passed through the lens travels while being converged by a refracting function of the converging lens 130, to the confocal movable mirror 322. The light, after being reflected by the confocal movable mirror 322, reaches the fixed mirror 126 and the light reflected by the fixed mirror 126 reaches the confocal pinhole 324.

The light having passed through the confocal pinhole 324, which is returned from the light scanning section 116, travels in through the optical fiber 216 to reach the four-terminal coupler 212, and a half of the light travels in through the optical fiber 218 by the four-terminal coupler 212 to reach the light detecting section 118. The light detecting section 118 detects information of the light, such as the wavelength or intensity of the light, and sends the information to the processing section 120. The processing section 120 processes the information along with driving data of the confocal movable mirror 322, to thereby obtain data such as the intensity of detected light at respective positions of the object surface 132.

In this embodiment, the light source section, the light scanning section and the light detecting section are connected optically with each other via optical fibers, and therefore there is less limitation with regard to the positions of these section with relative to each other. Thus, the degree of freedom in the designing of the structure can be raised.

Needless to say, the structure of the device according to the present embodiment may be modified variously. For example, in the above-mentioned structure, the light scanning section 116 comprises the swingably supported mirror 322 having the confocal pinhole and the fixedly supported mirror 126. However, such a structure may be modified as follows: the mirror 322 having the confocal pinhole is fixedly supported, and the mirror 126 is supported to be swingable. Alternatively, both the mirror 322 having the confocal pinhole and the mirror 126 may be swingably supported, and swung about axes directed in different directions, to achieve two-dimensional scanning.

Seventh Embodiment

Figure 18:
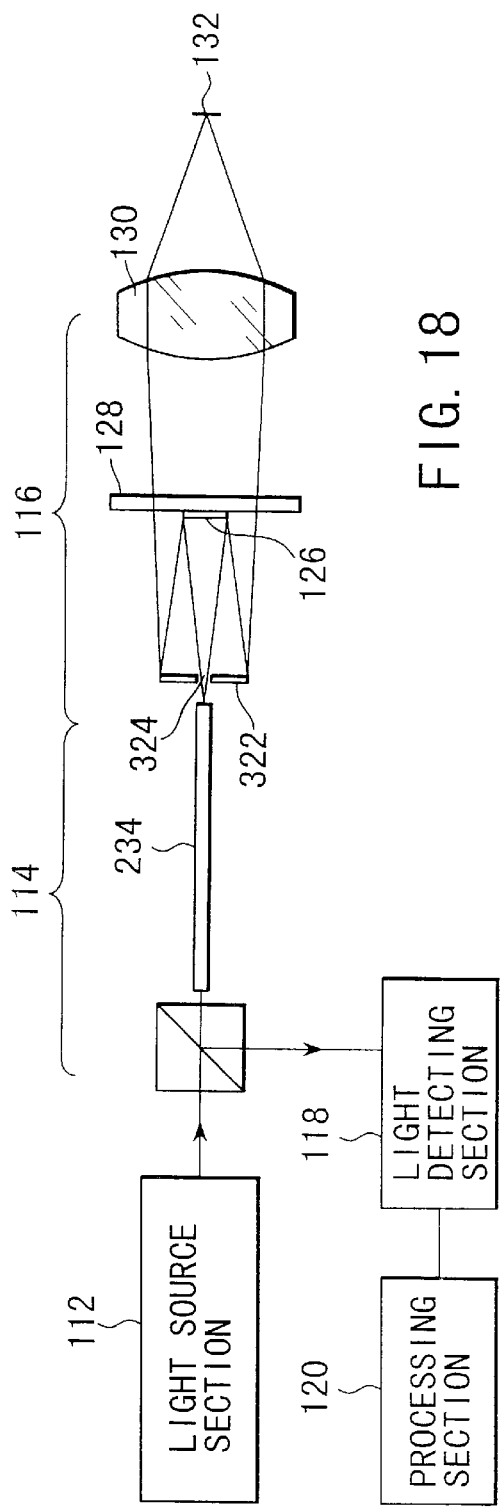
FIG. 18 shows a light scanning type confocal optical device, according to the seventh embodiment of the present invention.

FIG. 18 shows a light scanning type confocal optical device having a light scanning device, according to the seventh embodiment of the present invention. This embodiment has a structure in which the light selecting section and the light scanning section are optically connected with each other via a light transmitting section comprising an optical fiber, and this embodiment is an appropriate example to be applied to an endoscope in particular.

Referring to FIG. 18, the optical device basically comprises a light source section 112, a light transmitting section 114, a light scanning section 116, and a processing section 120.

The light source section 112 comprises, for example, a laser oscillator. The light transmitting section 114 comprises, for example, a beam splitter 232 for sorting incident light and detected light, and a flexible light transmitting section for optically connecting the beam splitter 232 and the light scanning section 116 with each other, such as an optical fiber 234. The light scanning section 116 has a confocal movable mirror 322, a fixed mirror 126, and a converging lens 130. The data processing section 120 processes data on the basis of scanned information and data from the light detecting section 118.

The confocal movable mirror 322 has a confocal pinhole 324 at its center, and is supported to be swingable about at least one axis. The fixed mirror 126 is fixedly supported by an optically transparent plate 128, such as a glass plate. A reflection surface of the confocal movable mirror 322 is located opposite to a reflection surface of the fixed mirror 126. Accordingly, the fixed mirror 126 reflects the light passing through the confocal pinhole 324 toward the reflection surface of the confocal movable mirror 322, and then the confocal movable mirror 322 reflects the light reflected from the fixed mirror 126 toward the converging lens 130, which converges the light transmitted from the confocal movable mirror 322 onto an object surface 132.

The connection between the optical fiber 234 and the confocal movable mirror 232 is the same as that of the optical fiber 216 and the confocal movable mirror 322 in the sixth embodiment (See FIGS. 15 to 17). More specifically, an end portion of the optical fiber 234 may be fixed to the confocal movable mirror 322 or situated close to the confocal movable mirror 322 with an interval. Further, a microlens may be provided on the end surface of the fiber. Which type should be employed is determined in accordance with the characteristics of the device to which this embodiment is applied.

The confocal movable mirror 322 is supported in a manner varying in accordance with the scanning method required for measurement. For example, when scanning is one-dimensionally performed, the confocal movable mirror 322 is supported to be swingable about one axis. In other words, it is swung about the axis to achieve one-dimensional scanning. When scanning is two-dimensionally performed, the confocal movable mirror 322 is supported to be swingable about two perpendicular axes. In other words, it is swung about the axes to achieve two-dimensional scanning. Needless to say, it may be supported to be swingable about two axes, and swung about one of the axes to achieve one-dimensional scanning.

The light from the light source section 112 passes through the beam splitter 232 and then is input to the optical fiber 234, in through which the light travels to reach the light scanning section 116. The light output from the end surface of the optical fiber 234 and having passed through the confocal pinhole 324 of the confocal movable mirror 322 is reflected by the fixed mirror 126 toward the reflection surface of the confocal movable mirror 322. The light reflected from the reflection surface of the confocal movable mirror 322 is incident on the converging lens 130, and is then converged onto the object surface 132 due to a refracting function of the converging lens 130.

The light incident on the object surface 132 is reflected irregularly therefrom in accordance with the shape and reflectance, etc. of the object. Of the irregularly reflected light, the light incident onto the converging lens 130 is reflected by the confocal movable mirror 322 and the fixed mirror 126 in order, to reach the confocal pinhole 324. In other words, part of the light reflected from the object surface 132 strikes on and passes through the converging lens 130, and the light passed through the lens travels while being converged by a refracting function of the converging lens 130, to the confocal movable mirror 322. The light, after being reflected by the confocal movable mirror 322, reaches the fixed mirror 126 and the light reflected by the fixed mirror 126 reaches the confocal pinhole 324.

The light having passed through the confocal pinhole 324, which is returned from the light scanning section 116, travels in through the optical fiber 234 to the beam splitter 232, by which the light is reflected to reach the light detecting section 118. The light detecting section 118 detects information of the light, such as the wavelength or intensity of the light, and sends the information to the processing section 120. The processing section 120 processes the information along with driving data of the confocal movable mirror 322, to thereby obtain data such as the intensity of detected light at respective positions of the object surface 132.

In this embodiment, the light transmitting section 114 has a flexible light transmitting material, more specifically, an optical fiber 234, by which the beam splitter 232 and the light scanning section 116 are optically connected to each other. Therefore, there is less limitation with regard to the positions of these sections with relative to each other (for example, directions and intervals between sections). Thus, the degree of freedom in the designing of the structure can be raised. It should be noted that such a structure is appropriate particularly for an endoscope.

Needless to say, the structure of the confocal optical device according to the present embodiment may be modified variously. For example, in the above-mentioned structure, the light scanning section 116 comprises the swingably supported mirror 322 having the confocal pinhole, and the fixedly supported mirror 126. However, such a structure may be modified as follows: the mirror 322 having the confocal pinhole is fixed, and the mirror 126 is supported to be swingable. Alternatively, the mirror 322 having the confocal pinhole, and the mirror 126 may be both swingably supported, and swung about axes directed in different directions, to achieve two-dimensional scanning.

Eight Embodiment

Figure 19:
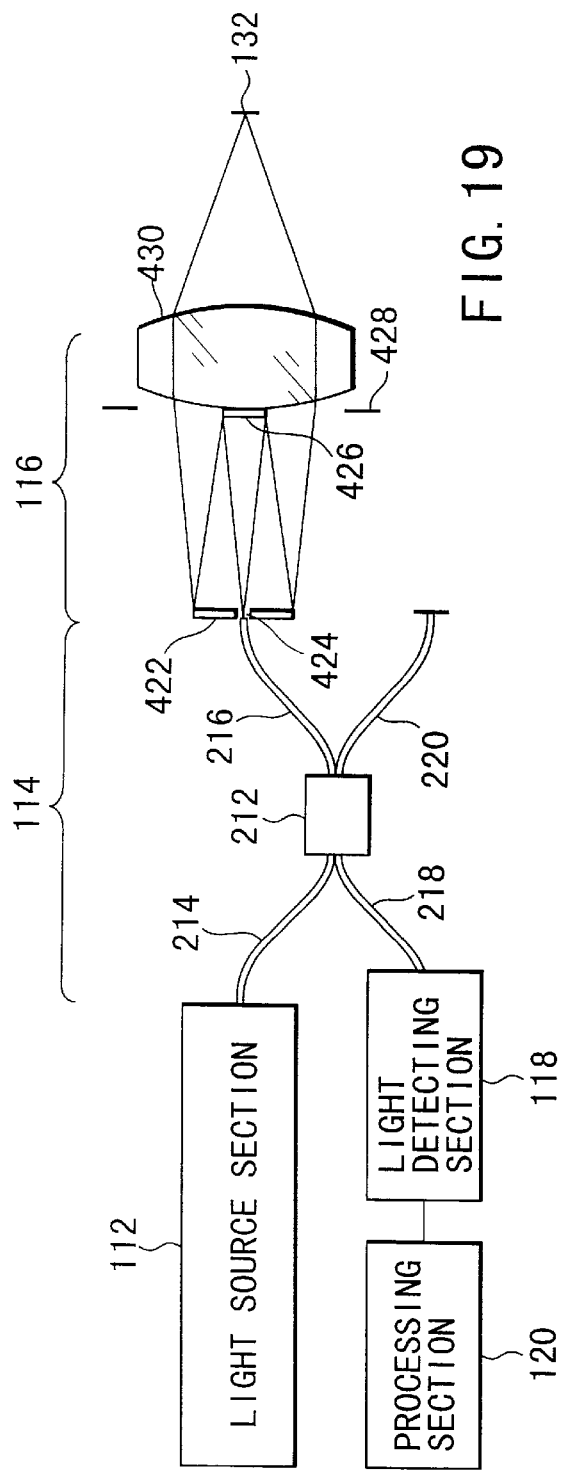
FIG. 19 shows a light scanning type confocal optical device, according to the eighth embodiment of the present invention.

FIG. 19 shows a light scanning type confocal optical device having a light scanning device, according to the eighth embodiment of the present invention. The present embodiment has a structure in which the light source section, the light scanning section and the light detecting section are optically connected with each other via optical fibers, and the fixed mirror is provided on the surface of the converging lens, which is on the light source side.

Referring to FIG. 19, the light scanning type confocal optical device basically comprises a light source section 112, a light transmitting section 114, a light scanning section 116, and a processing section 120.

The light source section 112 comprises, for example, a laser oscillator. The light transmitting section 114 comprises, for example, a four-terminal coupler 212 for sorting incident light and detected light, and four optical fibers 214, 216, 218 and 220. The light scanning section 116 has a confocal movable mirror 422, a fixed mirror 426, a converging lens 430 and a flare diaphragm 428. The processing section 120 processes data on the basis of scanned information and data from the light detecting section 118.

The light source section 112 and the four-terminal coupler 212 are optically coupled to each other via the optical fiber 214, the light scanning section 116 and the four-terminal coupler 212 are optically coupled to each other via the optical fiber 216, and the light detecting section 118 and the four-terminal coupler 212 are optically coupled to each other via the optical fiber 218. Further, the free end of the optical fiber 220 connected to the four-terminal coupler 212 has been treated to be non-reflective.

The confocal movable mirror 422 has a confocal pinhole 424 having a diameter of 20 $\mu$m or less, at its center. The diameter of the confocal pinhole 424 should be that correspond to the limit of the diffraction of the returned light. The fixed mirror 126 is provided on the surface of the converging lens 424, which is on the light source side, and therefore the reflection surface of the fixed mirror 126 is not planar but made to have a curvature. A reflection surface of the confocal movable mirror 422 is located opposite to a reflection surface of the fixed mirror 126. Accordingly, the fixed mirror 126 reflects the light passing through the confocal pinhole 424 toward the reflection surface of the confocal movable mirror 422, and then the confocal movable mirror 422 reflects the light reflected from the fixed mirror 426 toward the converging lens 430. The converging lens 430 converges the light transmitted from the confocal movable mirror 422 onto an object surface 132.

As the confocal movable mirror 422, for example, such a confocal driving mirror having a gimbal structure, that has been described with reference to FIG. 9, can be applied.

Referring again to FIG. 19, the light from the light source section 122 travels in through the optical fiber 214 to the four-terminal coupler 212, and a half of the light travels in through the optical fiber 216 by means of the four-terminal coupler 212, to reach the light scanning section 116. The light output from the optical fiber 216 passes through the confocal pinhole 424 of the confocal movable mirror 422, and then is reflected by the fixed mirror 426 toward the reflection surface of the confocal movable mirror 422. The light reflected from the reflection surface of the confocal movable mirror 422 is incident on the converging lens 430, and is then converged onto the object surface 132 due to a refracting function of the converging lens 430.

The light incident on the object surface 132 is reflected irregularly therefrom in accordance with the shape and reflectance, etc. of the object. Of the irregularly reflected light, the light incident onto the converging lens 430 is reflected by the confocal movable mirror 422 and then the fixed mirror 426 in order, to reach the confocal pinhole 424. In other words, part of the light reflected from the object surface 132 strikes on and passes through the converging lens 430, and the light passed through the lens travels while being converged by a refracting function of the converging lens 430, to the confocal movable mirror 422. The light, after being reflected by the confocal movable mirror 422, reaches the fixed mirror 426 and the light reflected by the fixed mirror 426 reaches the confocal pinhole 424.

The light having passed through the confocal pinhole 424, which is returned from the light scanning section 116, travels in through the optical fiber 216 to reach the four-terminal coupler 212, and a half of the light travels in through the optical fiber 218 by the four-terminal coupler 212 to reach the light detecting section 118. The light detecting section 118 detects information of the light, such as the wavelength or intensity of the light, and sends the information to the processing section 120. The processing section 120 processes the information along with driving data of the confocal movable mirror 422, to thereby obtain data such as the intensity of detected light at respective positions of the object surface 132.

In this embodiment, the light source section, the light scanning section and the light detecting section are connected optically with each other via optical fibers, and therefore there is less limitation with regard to the positions of these section with relative to each other. Thus, the degree of freedom in the designing of the structure can be raised. Further, since the fixed mirror 426 is provided on the converging lens 430, the structure of the apparatus can be made compact.

Study on Parameter of Each Optical Element

In connection with the converging lens of the optical scanning section, the structure which can achieve a necessary resolution, a satisfactory WD and the like, will now be described. The apparatus of the present invention can be applied to an endoscope; however in this case, it is necessary to correct the aberration of the optical system to the limit of the diffraction, in order to obtain the confocal effect, which is the main feature of the endoscope. Further, it is necessary to achieve a resolution of about 1 $\mu$m for performing a diagnosis on a target cell, and therefore it is necessary that the NA value of the object side of the lens should be 0.2 or higher. In order to correct the spherical aberration which occurs under the above-mentioned conditions, the curvature of field which occurs during scanning, and the coma-aberration, it is preferable that a converging lens having a non-spherical surface should be used. In the case of a single wavelength observation, the aberration can be corrected with use of a single lens having a non-spherical surface. The structure involved here is preferable in terms of making the apparatus compact by reducing the number of lenses. In this case, however, it is preferable that a glass material having a high refractive index (1.6 or higher) should be used. Further, in the case where the apparatus is used as an endoscope, it is necessary that a glass material having a resistance to sterilizing gases and gastric juice. In particular, when the non-spherical surface is set on the outer surface on the light source side (that is, the light scanning section side), the power of each of the reflection portion and transmitting portion of the converging lens can be optically set.

Since an increase in the diameter of the reflection surface of the light scanning device is directly related to an increase in the static driving voltage, the increase in the diameter would create a problem when the device is used in the human body. Therefore, the significant diameter of the movable mirror should preferably be 1.5 mm at the maximum. However, when the power of the reflecting portion of the lens is decreased, and the diameter of the light beam at the light scanning section is reduced, the diameter of the reflecting portion becomes large as compared to the diameter of the light beam when it is passing through the converging lens, and therefore the S/N ratio is deteriorated. It is preferable that the ratio of the diameter of the reflecting portion to the diameter of the light beam should be 0.3 or less, and the ratio of the diameter of the reflecting portion to the outer diameter of the lens should be 0.15 or less. Further, in consideration of achieving a low invasiveness and a high operability, the outer diameter of the endoscope should be reduced in design. In consideration of the case where the device is inserted into a cavity from the endoscope channel of the apparatus, the outer diameter of the lens should preferably be 3.0 mm or less. Further, when the application of the apparatus to the diagnosis of cells is taken into consideration, in which it is necessary obtain data within a tissue of 1 mm or larger, the distance from the end surface of the lens to the convergence point (which will be called WD hereinafter) should be at least 1 mm.

The resolution of the confocal endoscope is determined by the NA value of the convergence lens and the wavelength of the observation light, and it is preferable that the NA value of the object side should be 0.2 or more. When the outer diameter of the lens is represented by D, the NA value of the object side of the lens can be obtained approximately by D/2×WD. In consideration of a necessary resolution, it is preferable that the outer diameter of the lens, D, should satisfy the condition: D≧2×WD×NA. In consideration of the scanning by the mirror, it is preferable that the outer diameter of the lens, D, should satisfy the condition: $D \geq 2 \times WD \times NA + 0.5$. Therefore, the outer diameter of the lens should preferably be at least 1.0 mm.

The distance L from the movable mirror to the converging lens directly determines the length of the hard portion in the case of the endoscope; however in consideration of the low invasiveness and operability, it is preferable that L should be as short as possible. In the meantime, in order to assure a necessary resolution and WD value, it is required that the diameter of the light beam at the lens portion should be at least some value. Under these circumstances, there are limits set for the value of the radius of curvature and the value of L. The following is a procedure of inducing the optical condition for the value L. That is, where the radius of the curvature of the lens is R, it is necessary to satisfy the condition of $2 \times R > D - 0.1$ so that the light beam is not eclipsed by the outer periphery of the lens. Therefore, when the refractive index of the glass material is 1.5, $D - 0.1 < 2 \times R = WD \times 2 \times L/(WD - 2'L)$, or $D < WD \times 2 \times L/(WD - 2 \times L) + 0.1 = D'$. In the mean time, in the case where the outer diameter of the lens which is necessary to assure a necessary resolution, is $D_{min}$, it is necessary to satisfy the condition of $D' > D_{min}$.

Accordingly, the distance L from the movable mirror to the converging lens must satisfy the condition of $L \geq WD \times D_{min}/2(WD + D_{min})$. Here, when WD=2.0 mm and $D_{min}$=1.5 mm, it is preferable that L should satisfy the condition of $L \geq 0.45$ mm. In the meantime, when the focal distance is reduced while maintaining the NA value of the object side of the converging lens, the L value can be decreased, but at the same time, it causes aberration. Therefore, it is further preferable that the condition of $L \geq 1.0$ should be satisfied. The focal distance here is defined as the focal distance of the case of a transmission system. As described above, when the focal distance is reduced while maintaining the NA value of the object side of the converging lens, an aberration is created, and therefore, it is preferable that the focal distance f should satisfy the condition of $0.7 \text{ mm} \leq f \leq 2.5 \text{ mm}$. More specifically, if the focal distance becomes shorter than 0.7 mm, it becomes difficult to correct the aberration, whereas if the focal distance becomes larger than 2.5 mm, the entire structure of the optical system increases in size, which is not desirable. The focal distance f, the distance L from the movable mirror to the converging lens, and the distance WD from the end surface of the converging lens to the converging point, have approximately the relationship of $f = 3 \times WD \times L/(WD + 3 \times L)$, and this formula of the relationship for the distance f can be expressed also by $0.7 \text{ mm} \leq 3 \times WD \times L/(WD + 3 \times L) \leq 2.5$.

Next, the optimal value for the curvature of the reflection surface of the converging lens will now be considered. The reflection light from the light scanning section is made incident again on the converging lens; however the incident light on the reflecting section becomes unnecessary light, and reflects multiply within the scanning section and the converging lens to become stray light. Therefore, as the diameter of the reflecting section becomes smaller as compared to the diameter of the light beam which passes through the converging lens, an image of a better S/N ratio can be obtained. If the power of the mirror section is excessively increased, the diameter of the light beam when it reflects in the light scanning section becomes large. As a result, the outer diameter of the light scanning section enlarges, and the driving voltage is directly affected. When the radius of the curvature of the reflecting section is R, and the distance from the light scanning section to the converging lens is L, the diameter D1 of the light beam on the reflecting surface of the lens has the relationship of $D1 = L \times \theta$, and the diameter D2 of the light beam when passing through the lens has the relationship of $D2 = L \times \theta + 2 \times L \times (\theta + 2 \times L \times \theta/R)$. In this case, $\sin \theta$ is NA on the confocal pinhole side of the lens.

The ratio of the diameter of the reflecting section to the diameter of the light beam when it is made incident once again on the converging lens, that is, D1/D2, can be expressed by $1/(2 \times (1 + 2 \times L/R) + 1)$. In order to suppress the S/N ratio, it is preferable that this relationship should satisfy the condition of $1/(2 \times (1 + 2 \times L/R) + 1 \leq 0.25$. In the meantime, the diameter of the light beam at the light scanning section, when the light output angle of the confocal pinhole is $\theta$, can be expressed by $2 \times L \times \theta \times (1 + L/R)$, and it is preferable that the condition of $2 \times L \times \theta \times (1 + L/R) \leq 1.0$ mm. Accordingly, it is preferable that the radius R of the curvature of the reflecting surface of the lens should satisfy the condition of $2 \times L2 \times \theta/(1 - 2 \times \theta \times L) \leq R \leq 4 \times L$.

In the case of the confocal optical system, a resolution directed in the Z-axial direction results, however the limit of the resolving power is lower by even 10 times than the limit of the resolving power in the XY-axial direction. As a counter-measure to this, it is considered that a second confocal pinhole is provided in the vicinity of the already-set confocal pinhole, such as to have the same center as that of the already-set confocal pinhole, and be directed perpendicular to the optical axis. By providing a confocal pinhole of the just-mentioned structure, the scattered light (unnecessary light) from the other points than the point to be examined in the Z-axial direction can be blocked, thereby making it possible to improve the resolving power in the Z-axial direction.

Figure 20:
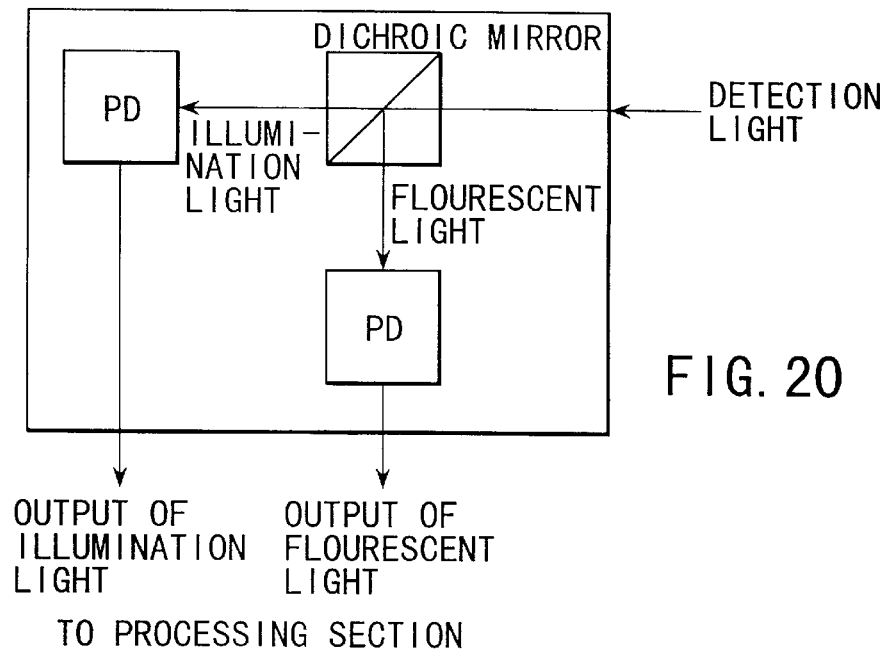
FIG. 20 shows a light scanning type confocal optical device, according to the eighth embodiment of the present invention.

The above description was made in connection with the case of the observation by a monochromatic laser light; however the results of the studies described can be applied to the case where light having a plurality of wavelengths is employed, such as a fluorescent observation. Generally, in order to observe a living tissue, a mucus membrane or the like, a fluorescent material is injected in advance to an object to be examined, and the object is subjected to a fluorescent observation. In such a fluorescent observation, a focal error of the returned light occurs on the axis and a direction perpendicular to the axis, due to the difference between the illumination light and detection light in wavelength. When the amount of the error becomes large as compared to the size of the diameter of the confocal pinhole, the data of the surface to be examined is disturbed by noise, thus deteriorating the resolving power. In order to avoid such a drawback, the following structure is preferable. That is, a lens whose color aberration has been corrected with regard to the wavelengths of both of the illumination light and detection light (fluorescent light), is employed, and a spectroscopic device such as a dichroic mirror is provided, as can be seen in FIG. 20. Thus, the illumination light and fluorescent light are separately detected by photoelectric means such as photo-diode. It should be noted that as some of the examples of the method of reducing a focal error by color, there is a method which uses a glass material having a low color dispersion property and a method of canceling out a color aberration with use of a plurality of lenses (cemented lens).

In the fluorescent observation by a fluorescent element ICG (indocyanine green) or the like, the difference between excitation light and fluorescent light in wavelength is about 50 nm. When a glass material having a low color dispersion property is used for color correction, the Abbe number of the glass material should preferably be 40 or more. In this case, naturally, a glass material of a low refractive index is selected; however it is preferable that the lens having both surfaces made non-spherical should be used for the correction of an aberration which occurs. Alternatively, in the case where the color aberration is corrected with use of a cemented lens, it is general that a glass material having a large Abbe number (crown type) is used to make a convex lens, and a glass material having a small Abbe number (flint type) is used to make a concave lens, and it is preferable that the relationships of n1>n2 and v1>v2 should be satisfied where the refractive index and the Abbe number of the convex lens are represented by n1 and v1, respectively, and the refractive index and the Abbe number of the concave lens are represented by n2 and v2, respectively.

In the case where the color aberration is carried out as above, the cemented surface is convex on the high refractive index glass material side. However, in this case, it is difficult to perform a sufficient aberration correction with one non-spherical surface. Therefore, it is also possible that the priority should be given to the correction of a coma aberration which occurs and the curvature of an image surface, and the cemented surface should be made convex to the low refractive index glass material side, so as to disperse the power. Further, in the case where the difference between the excitation light and fluorescent light in wavelength is 30 nm or less, the aberration can be corrected to achieve an NA value of the object side, of about 0.2 if one surface is made non-spherical and the cemented surface is made convex to the high refractive index glass material side. However, in the case where the difference between the excitation light and fluorescent light in wavelength is 30 nm or more, it is required that the cemented surface should have some power, and therefore both surfaces should preferably be made non-spherical. Further, it is desirable that the high refractive index glass material portion should be situated on an object side, which has a large incident angle of the light beam.

EXAMPLE 1

Figure 21:
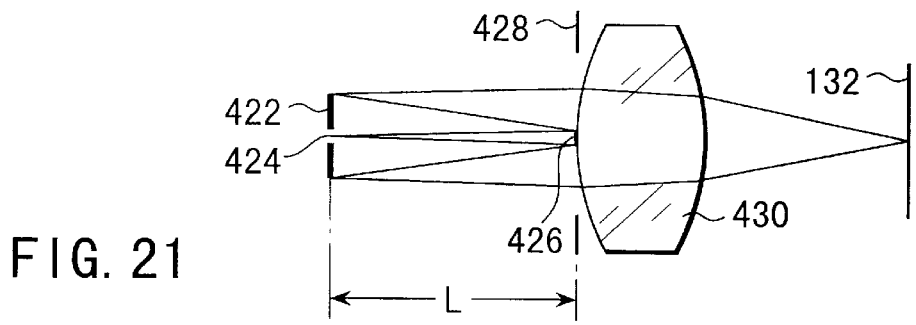
FIG. 21 shows a light scanning section of the eighth embodiment, according to the first practical example, in which the movable mirror is perpendicular to the optical axis.
Figure 22:
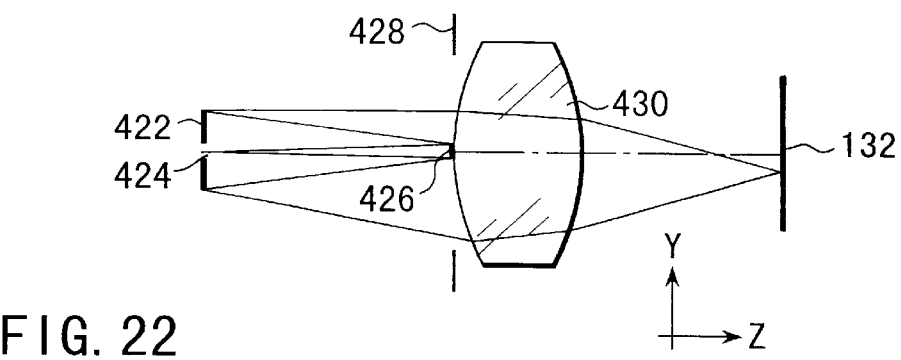
FIG. 22 shows a light scanning section of the eighth embodiment, according to the first practical example, in which the movable mirror is inclined by 3° in an XY direction.

FIGS. 21 and 22 show the structure of the light scanning section 116 of this example. FIG. 21 illustrates a state in which the movable mirror is perpendicular to the optical axis, and FIG. 22 shows a state in which the mirror is tilted towards the XY direction. In this example, the converging lens 430 is a single lens which is made of a high refractive index glass material having a refractive index of 1.78, and has an outer diameter of 1.4 mm and a focal distance of 1.11 mm, and the aberration has been corrected sufficiently with the non-spherical surface on the light source side. Therefore, the Strehl strength of the optical system is as high in performance as 90% or more of an ideal state, and a resolving power of about 1 $\mu$m on the object side is achieved. The fixed mirror 426 provided for the converging lens 430 has a radius of curvature of 1.47 mm, and a diameter of 0.1 mm, and is formed by depositing aluminum or gold. The significant diameter of the movable mirror 422 is 0.4 mm, and the distance L from the movable mirror 422 to the converging lens 430 is 1.53 mm (see FIG. 21).

The following are the data of the lens used in this example.

$r_1 = \infty$ (object point)
  $d_1 = 1.5318$
$r_2$ 1.4739 (reflecting surface)
  $d_2 = -1.5318$
$r_3 = \infty$ (reflecting surface)
  $d_3 = 1.5318$ -continued $r_4 = \infty$ (flare diaphragm)
  $d_4 = 0.0000$
$r_5 = 1.4739$
  $d_5 = 0.8194$     $n_5 = 1.77862$     $v_5 = 25.76$
$r_6 = 1.6071$
  $d_6 = 1.3100$
$r_7 = \infty$ (image)

Non-spherical surface coefficient

First surface

K = −0.2798          AC2 = 0
AC4 = −1.8457 × 10⁻¹   AC6 = 3.6371 × 10⁻²
AC8 = −1.8244 × 10⁻¹   AC10 = 2.4773 × 10⁻¹

Fifth surface

K = −0.2798          AC2 = 0
AC4 = −1.8457 × 10⁻¹   AC6 = 3.6371 × 10⁻²
AC8 = −1.8244 × 10⁻¹   AC10 = 2.4773 × 10⁻¹ where K, AC2, ... are non-spherical coefficients of the case where the shapes of the surfaces are set to be non-spherical surfaces which are symmetrical with respect to rotation axis, which the optical system is rotated by an even number of times. Here, when the optical axial direction is set in the Z-axial direction, the shape of a surface (the Z component at each point (X, V) is expressed by the following relationship.

$$Z = 1/RDY \times S^2/(1+(1-(K+1) \times RDY^{-2} \times S^2) + AC2 \times S^2 + AC4 \times S^4 + AC6 \times S^6 + \ldots,$$

where $S^2 = X^2 + Y^2$, and RDY is the radius of the curvature.

EXAMPLE 2

Figure 23:
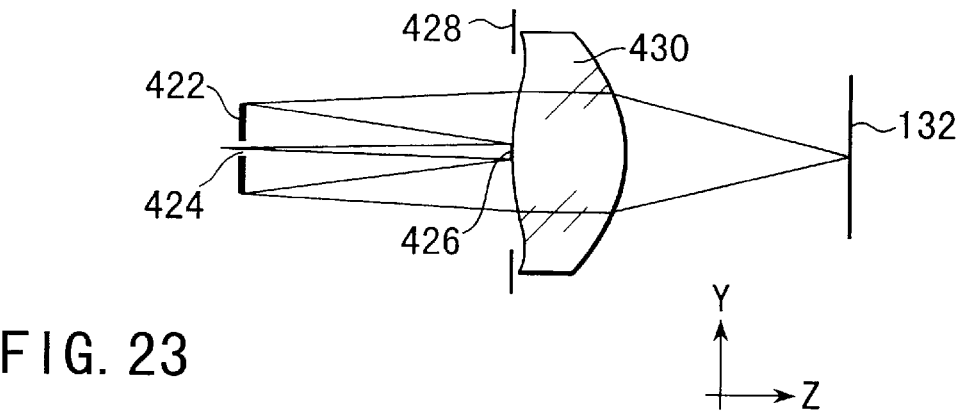
FIG. 23 shows a light scanning section of the eighth embodiment, according to the second practical example, in which the movable mirror is perpendicular to the optical axis.

FIG. 23 shows the structure of the light scanning section 116 of this example. This example is different from Example 1 in the respect that the lens is replaced by a type made of a glass material having a low color dispersion, and the color correction is carried out by this lens. In this example, the converging lens 430 is a single lens which is made of a high refractive index glass material having a refractive index of 1.51 and an Abbe number of 64, and the image formation surface side is made non-spherical. In the case of the observation with this example using a fluorescent substance IGC having an excitation light of 680 nm and an observation light of 850 nm, the error taken from the center of the confocal pinhole 424 to the focal point of the returned light can be suppressed to 0.2 or less with respect to the diameter of the confocal pinhole. Further, in the case of the fluorescent observation which uses ICG, a sufficient color correction can be achieved.

The following are the data of the lens used in this example.

$r_1 = \infty$ (object point)
  $d_1 = 1.5318$
$r_2$ 1.1561 (reflecting surface)
  $d_2 = -1.5318$
$r_3 = \infty$ (reflecting surface)
  $d_3 = 1.5318$
$r_4 = \infty$ (flare diaphragm)
  $d_4 = 0.0000$
$r_5 = 1.1561$
  $d_5 = 0.7000$     $n_5 = 1.51462$     $v_5 = 64.14$
$r_6 = -0.8729$
  $d_6 = 1.3150$ -continued $r_7 = \infty$ (image)

Non-spherical surface coefficient

First surface

K = −0.5971  AC2 = 0
AC4 = −5.2869 × 10⁻¹  AC6 = −4.3151 × 10⁻¹
AC8 = −4.0730 × 10⁻¹  AC10 = 5.9556 × 10⁻¹
AC12 = 2.2911 × 10⁻¹  AC14 = 7.5293 × 10⁻²
AC16 = 8.4031 × 10⁻²  AC18 = 0
AC20 = 0

Fifth surface

K = −0.5971  AC2 = 0
AC4 = −5.2869 × 10⁻¹  AC6 = −4.3151 × 10⁻¹
AC8 = −4.0730 × 10⁻¹  AC10 = 5.9556 × 10⁻¹
AC12 = 2.2911 × 10⁻¹  AC14 = 7.5293 × 10⁻²
AC16 = 8.4031 × 10⁻²  AC18 = 0
AC20 = 0

EXAMPLE 3

Figure 24:
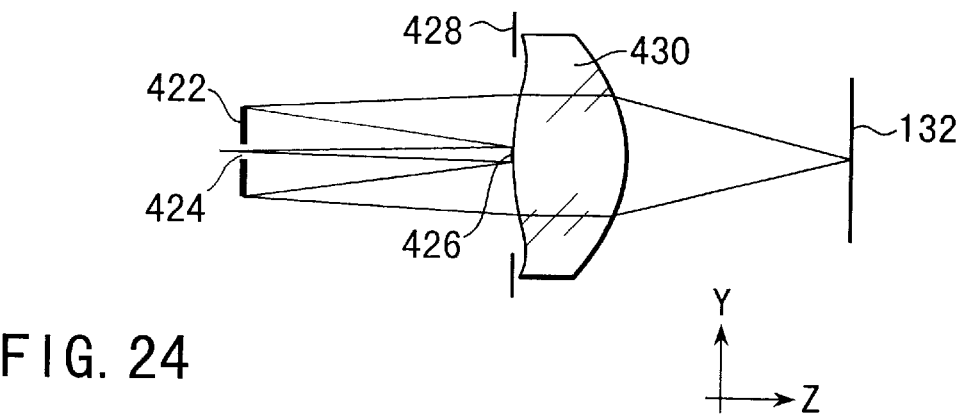
FIG. 24 shows a light scanning section of the eighth embodiment, according to the third practical example, in which the movable mirror is perpendicular to the optical axis.

FIG. 24 shows the structure of the light scanning section 116 of this example. In this example, the converging lens 430 is a single lens having both surfaces made non-spherical. With this example, it becomes possible to correct the error portion of the astigmatism and the curvature of the image surface, which remains uncorrected with the converging lens 430 of Example 2.

The following are the data of the lens used in this example.

$r_1 = \infty$ (object point)
   $d_1 = 1.5318$
$r_2$ 0.9862 (reflecting surface)
   $d_2 = -1.5318$
$r_3 = \infty$ (reflecting surface)
   $d_3 = 1.5318$
$r_4 = \infty$ (flare diaphragm)
   $d_4 = 0.0000$
$r_5 = 0.9862$
   $d_5 = 0.7000$  $n_5 = 1.51462$  $\nu_5 = 64.14$
$r_6 = -0.9356$
   $d_6 = 1.1310$
$r_7 = \infty$ (image)

Non-spherical surface coefficient

First surface

K = −0.6285  AC2 = 0
AC4 = −5.5146 × 10⁻¹  AC6 = −4.0968 × 10⁻¹
AC8 = −3.8277 × 10⁻¹  AC10 = 5.7275 × 10⁻¹
AC12 = 1.3536 × 10⁻¹  AC14 = −1.0221 × 10⁻¹
AC16 = −2.0457 × 10⁻¹  AC18 = 0
AC20 = 0

Fifth surface

K = −0.6285  AC2 = 0
AC4 = −5.5146 × 10⁻¹  AC6 = −4.0968 × 10⁻¹
AC8 = −3.8277 × 10⁻¹  AC10 = 5.7275 × 10⁻¹
AC12 = 1.3536 × 10⁻¹  AC14 = −1.0221 × 10⁻¹
AC16 = −2.0457 × 10⁻¹  AC18 = 0
AC20 = 0

Sixth surface

K = 0.0067  AC2 = −7.1240 × 10⁻²
AC4 = 3.2057 × 10⁻²  AC6 = −7.2710 × 10⁻²
AC8 = −6.2886 × 10⁻²  AC10 = 3.6925 × 10⁻³

EXAMPLE 4

Figure 25:
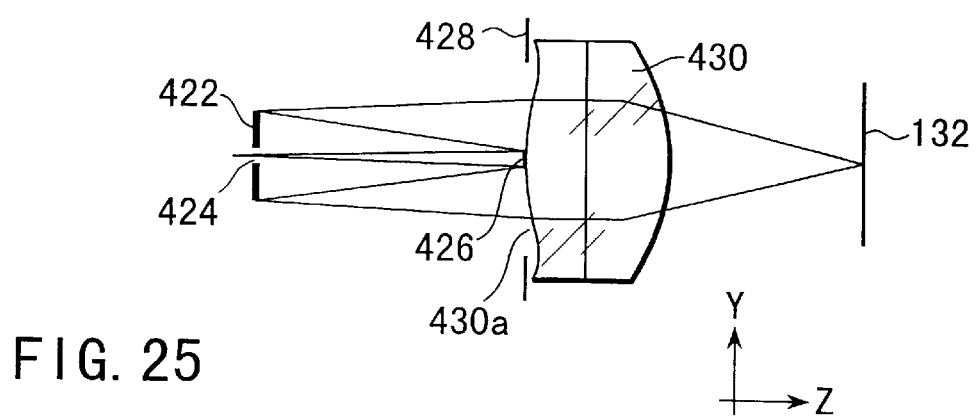
FIG. 25 shows a light scanning section of the eighth embodiment, according to the fourth practical example, in which the movable mirror is perpendicular to the optical axis.

FIG. 25 shows the structure of the light scanning section 116 of this example. In this example, the converging lens 430 is a cemented lens, already subjected to the wavelength correction, and the outer surface 430a of the light source side is made non-spherical. In this case, the cemented surface is made convex towards the high refraction lens side, so as to carry out the color correction. However, it is designed to disperse the power so as to suppress the aberration which occurs due to the use of a low refraction glass material, and therefore the power of the cemented surface can be suppressed to be low.

The following are the data of the lens used in this example.

$r_1 = \infty$ (object point)
   $d_1 = 1.5318$
$r_2$ 1.2482 (reflecting surface)
   $d_2 = -1.5318$
$r_3 = \infty$ (reflecting surface)
   $d_3 = 1.5318$
$r_4 = \infty$ (flare diaphragm)
   $d_4 = 0.0000$
$r_5 = 1.2482$
   $d_5 = 0.4500$  $n_5 = 1.56188$  $\nu_5 = 60.70$
$r_6 = -5.4526$
   $d_6 = 0.4200$  $n_6 = 1.77862$  $\nu_6 = 25.76$
$r_7 = -1.2775$
$r_8 = \infty$ (image)

Non-spherical surface coefficient

First surface

K = −0.3497  AC2 = 0
AC4 = −4.1136 × 10⁻¹  AC6 = −1.3334 × 10⁻¹
AC8 = −5.9056 × 10⁻³  AC10 = 7.6352 × 10⁻²
AC12 = 9.5187 × 10⁻²  AC14 = 1.7273 × 10⁻²
AC16 = −3.5184 × 10⁻²  AC18 = 0
AC20 = 0

Fifth surface

K = −0.3497  AC2 = 0
AC4 = −4.1136 × 10⁻¹  AC6 = −1.3334 × 10⁻¹
AC8 = −5.9056 × 10⁻³  AC10 = 7.6352 × 10⁻²
AC12 = 9.5187 × 10⁻²  AC14 = 1.7273 × 10⁻²
AC16 = −3.5184 × 10⁻²  AC18 = 0
AC20 = 0

EXAMPLE 5

Figure 26:
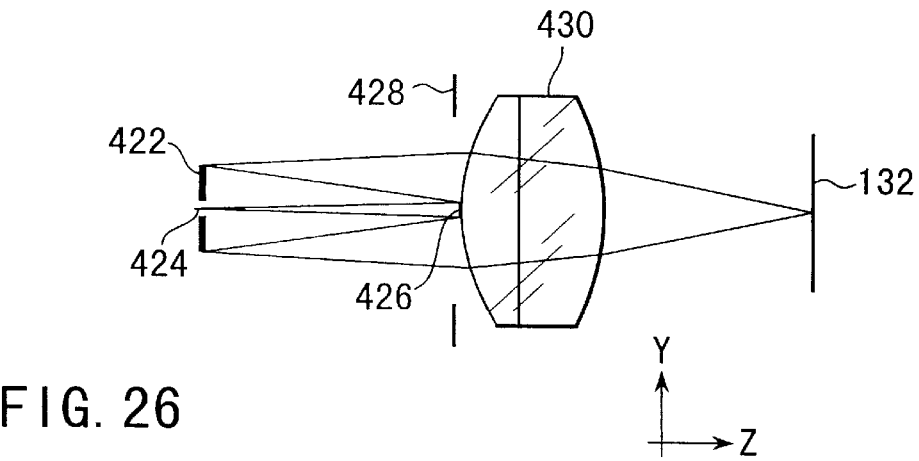
FIG. 26 shows a light scanning section of the eighth embodiment, according to the fifth practical example, in which the movable mirror is perpendicular to the optical axis.

FIG. 26 shows the structure of the light scanning section 116 of this example. In this example, the converging lens 430 is a cemented lens prepared by cementing a glass material having a low color dispersion, having both surfaces made non-spherical. With this example, it becomes possible to correct the aberration at 90% or higher by the Strehl strength applied at the position of the confocal pinhole 424, despite the low refractive index glass material. The error taken from the center of the confocal pinhole 424 to the focal point of the returned light is no more than 0.2 with respect to the diameter of the confocal pinhole, and a color correction can be sufficiently achieved. In this case, the glass materials of both lenses to be cemented may be the same or different from each other.

The following are the data of the lens used in this example.

```
r₁ = ∞ (object point)
    d₁ = 1.5318
r₂  1.0055 (reflecting surface)
    d₂ = −1.5318
r₃ = ∞ (reflecting surface)
    d₃ = 1.5318
r₄ = ∞ (flare diaphragm)
    d₄ = 0.0000
r₅ = 1.0055
    d₅ = 0.4000       n₅ = 1.56188    ν₅ = 60.70
r₆ = −133.1884
    d₆ = 0.5500       n₆ = 1.51462    ν₆ = 64.14
r₇ = −1.1624
    d₇ = 1.3080
r₈ = ∞ (image)
```

Non-spherical surface coefficient

First surface

K = −0.3191                 AC2 = 0
AC4 = −1.9447 × 10⁻¹        AC6 = 1.0917 × 10⁻¹
AC8 = −2.1640 × 10⁻¹        AC10 = 1.2528 × 10⁻¹

Fifth surface

K = −0.3191                 AC2 = 0
AC4 = −1.9447 × 10⁻¹        AC6 = 1.0917 × 10⁻¹
AC8 = −2.1640 × 10⁻¹        AC10 = 1.2528 × 10⁻¹

Seventh surface

K = 0                       AC2 = 0
AC4 = 2.4212 × 10⁻¹         AC6 = −2.6070 × 10⁻²
AC8 = 0                     AC10 = 0
AC12 = 0                    AC14 = 2.4212 × 10⁻¹
AC16 = −2.6070 × 10⁻²       AC18 = 0
AC20 = 0

EXAMPLE 6

Figure 27:
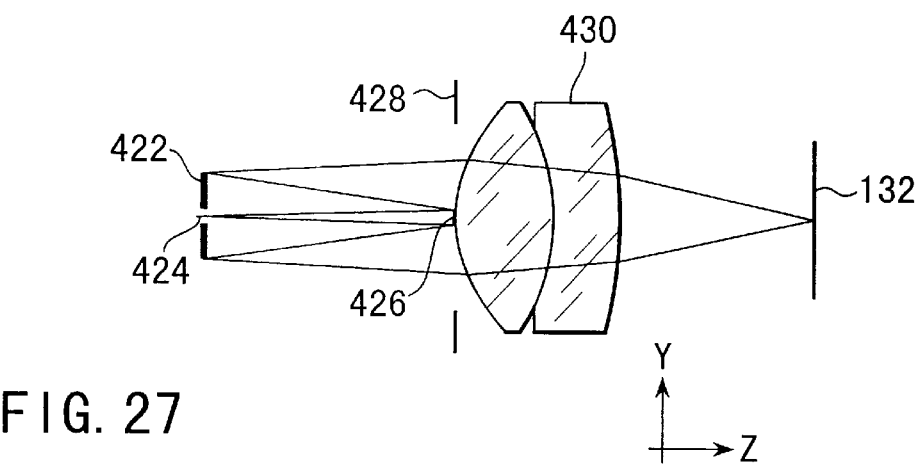
FIG. 27 shows a light scanning section of the eighth embodiment, according to the sixth practical example, in which the movable mirror is perpendicular to the optical axis.

FIG. 27 shows the structure of the light scanning section 116 of this example. In this example, the converging lens 430 is a cemented lens, having both outer surfaces made non-spherical, in order to achieve an aberration correction and cancellation of color aberration by cementing. Further, a high refractive index glass material is situated on the object side (that is, the object 132 side), so as to perform a further aberration correction. In this example, since a glass material having a higher refractive index higher than that of Example 5, it is possible to correct the aberration at 90% or higher by the Strehl strength applied at the position of the confocal pinhole, even in the mirror scanning.

The following are the data of the lens used in this example.

```
r₁ = ∞ (object point)
    d₁ = 1.5318
r₂ = 0.8727 (reflecting surface)
    d₂ = −1.5318
r₃ = ∞ (reflecting surface)
    d₃ = 1.5318
r₄ = ∞ (flare diaphragm)
    d₄ = 0.000
r₅ = 0.8727
    d₅ = 0.6066       n₅ = 1.56188    ν₅ = 60.70
r₆ = −1.3165
    d₆ = 0.4428       n₆ = 1.77862    ν₆ = 25.76
r₇ = −1.4704
    d₇ = 1.2721
r₈ = ∞ (image)
```

Non-spherical surface coefficient

First surface

K = −0.1391                 AC2 = 0
AC4 = −1.4486 × 10⁻¹        AC6 = 7.8087 × 10⁻²
AC8 = 2.2988 × 10⁻³         AC10 = 0

Fifth surface

K = −0.1391                 AC2 = 0
AC4 = −1.4486 × 10⁻¹        AC6 = 7.8087 × 10⁻²
AC8 = 2.2988 × 10⁻³         AC10 = 0

Seventh surface

K = −3.7662                 AC2 = 0
AC4 = 9.6398 × 10⁻²         AC6 = 1.6116 × 10⁻¹
AC8 = 2.4360 × 10⁻²         AC10 = 5.2669 × 10⁻²

EXAMPLE 7

Figure 28:
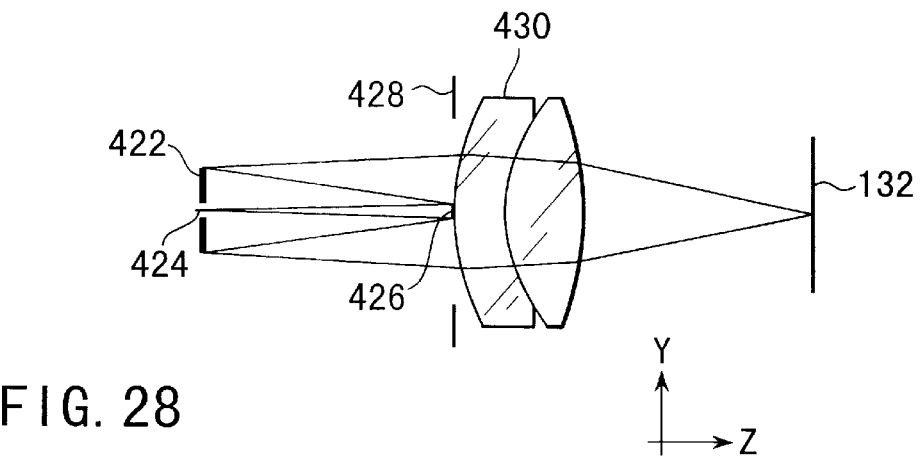
FIG. 28 shows a light scanning section of the eighth embodiment, according to the seventh practical example, in which the movable mirror is perpendicular to the optical axis.

FIG. 28 shows the structure of the light scanning section 116 of this example. In this example, the movable mirror 422 is a convex mirror having a confocal pinhole 424 at its center. Therefore, the movable mirror 422 has a convex power and diverges the light beam after the reflection. Thus, the ratio of the fixed mirror 426 occupying the light beam which passes through the converging lens 430 is decreased. Consequently, it suffices only if the outer diameter of the movable mirror 422 is 0.25 mm, which is only 60% of the case where the movable mirror is made to be flat surface. Therefore, according to this example, it is possible to provide an optical system which satisfy the required resolving power and S/N while decreasing the diameter of the movable mirror.

The following are the data of the lens used in this example.

```
r₁ = ∞ (object point)
    d₁ = 1.5318
r₂ = 1.3671 (reflecting surface)
    d₂ = −1.5318
r₃ = −3.9834 (reflecting surface)
    d₃ = 1.5318
r₄ = ∞ (flare diaphragm)
    d₄ = 0.000
r₅ = 1.3671
    d₅ = 0.3200       n₅ = 1.56188    ν₅ = 60.70
r₆ = 1.0260
    d₆ = 0.5000       n₆ = 1.77862    ν₆ = 25.76
r₇ = −1.4543
    d₇ = 1.2840
r₈ = ∞ (image)
```

Non-spherical surface coefficient

First surface

K = −0.3034                 AC2 = 0
AC4 = −2.3106 × 10⁻¹        AC6 = −3.0709 × 10⁻³
AC8 = 0                     AC10 = 0

Fifth surface

K = −0.3034                 AC2 = 0
AC4 = −2.3106 × 10⁻¹        AC6 = −3.0709 × 10⁻³
AC8 = 0                     AC10 = 0

Seventh surface

K = −3.6582                 AC2 = 0
AC4 = −1.0754 × 10⁻²        AC6 = 1.9601 × 10⁻³
AC8 = 0                     AC10 = 0

EXAMPLE 8

Figure 29:
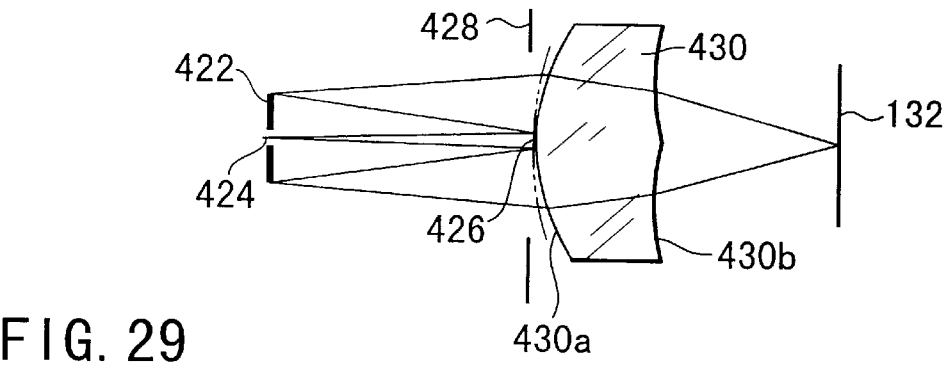
FIG. 29 shows a light scanning section of the eighth embodiment, according to the eighth practical example, in which the movable mirror is perpendicular to the optical axis.
Figure 30:
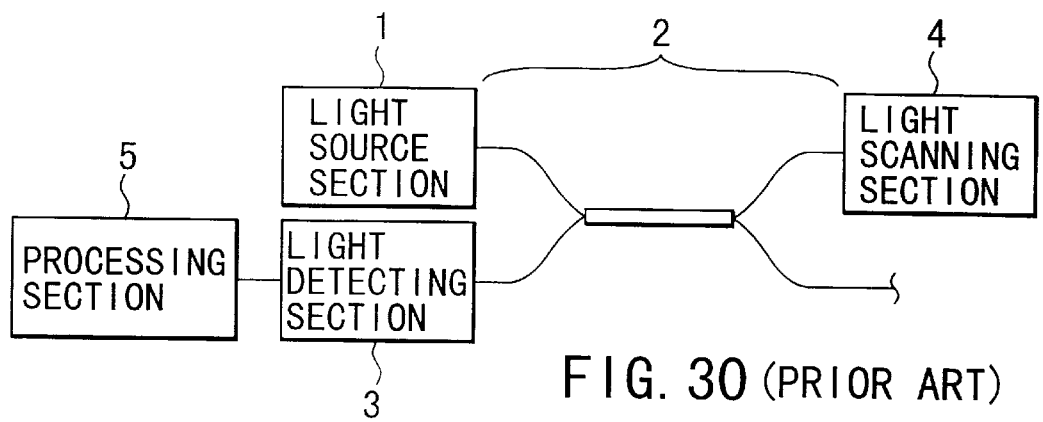
FIG. 30 schematically shows the structure of a conventional light scanning type micro-confocal microscope.
Figure 31:
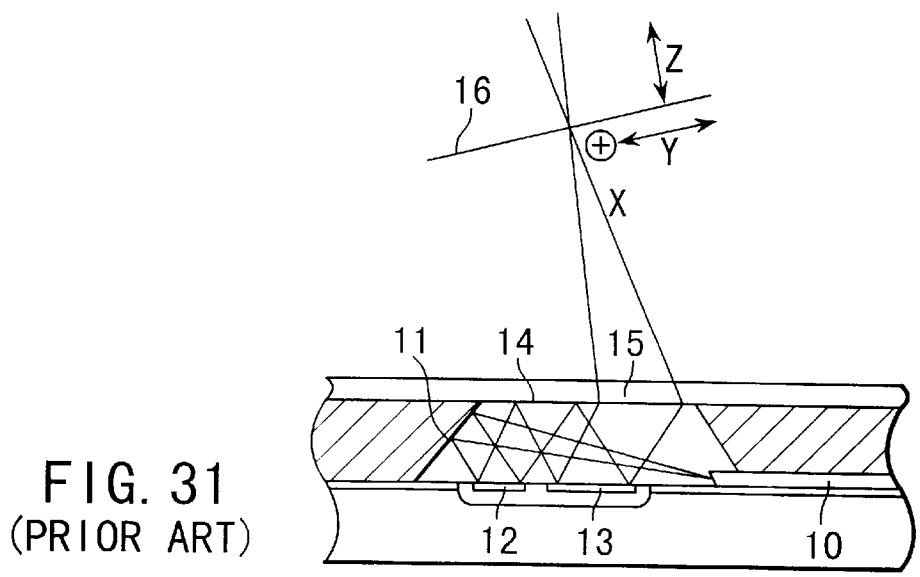
FIG. 31 is a side view of a scanning section of the microscope of FIG. 30.

FIG. 29 shows the structure of the light scanning section 116 of this example. In this example, the converging lens 430 has a surface 430a on the light source side, which has a two-step curvature, and a surface 430b on the object side (examined surface side 132), which is made non-spherical. More specifically, the curvature of the fixed mirror 426 provided for the converging lens 430 is made different from the curvature of the transmitting section, and an appropriate power is set, so as to suppress the creation of aberration. It should be noted that the surface on the object side may not be non-spherical.

The following are the data of the lens used in this example.

---

$r_1 = \infty$ (object point)
$\quad d_1 = 1.5318$
$r_2 = 2.7762$ (reflecting surface)
$\quad d_2 = -1.5318$
$r_3 = \infty$ (reflecting surface)
$\quad d_3 = 1.5318$
$r_4 = \infty$ (flare diaphragm)
$\quad d_4 = 0.0000$
$r_5 = 1.1366$
$\quad d_5 = 0.7500 \quad\quad n_5 = 1.77862 \quad\quad v_5 = 25.76$
$r_6 = -1.6543$
$\quad d_6 = 1.3150$
$r_8 = \infty$ (image)

Non-spherical surface coefficient

Sixth surface $K = -0.2784 \quad\quad AC2 = 1.4225 \times 10^{-1}$
$AC4 = 3.0689 \times 10^{-1} \quad\quad AC6 = -8.0677 \times 10^{-2}$
$AC8 = -1.3790 \times 10^{-1} \quad\quad AC10 = 3.6666 \times 10^{-1}$
$AC12 = 2.5504 \times 10^{-1} \quad\quad AC14 = 4.2450 \times 10^{-1}$
$AC16 = 5.0066 \times 10^{-1} \quad\quad AC18 = 1.1000 \times 10^{-1}$
$AC20 = 8.2597 \times 10^{-1}$

---

In the above-provided lens data, each of $r_1, r_2, \ldots$ represents the radius of curvature of a surface of the respective lens or the like, each of $d_1, d_2, \ldots$ represents the thickness of the respective lens or the like, and an air gap, each of $n_1, n_2, \ldots$ represents the refractive index of the respective lens, and each of $v_1, v_2, \ldots$ represents an Abbe number of the respective lens.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The light scanning devices according to the present invention, which have been described in terms of confocal optical devices, are not limited to the particular embodiments described above, and may be applied to other optical types of devices, such as an optical data recording system, a projector, or a flat-panel display (e.g., a television, a computer display, a head-mounted display, or the like).

We claim:

1. A light scanning type confocal optical device comprising:

a light source for outputting light;

a light scanning section for converging light from the light source onto a surface of an object to be detected, and scanning the light over the surface;

a confocal pinhole provided between the light source and the light scanning section, light that has passed through the confocal pinhole being substantially regarded as light from the point light source, such that a confocal optical system is formed between the confocal pinhole and the surface of the object; and a light detecting section for detecting that part of the light scanned by the light scanning section which is returned from the surface of the object;

wherein the light scanning section comprises a first reflection surface having the confocal pinhole, a second reflection surface for reflecting the light from the light source, having passed through the confocal pinhole, towards the first reflection surface, a converging lens for converging the light reflected from the first reflection surface on the surface of the object to be detected, and driving means for swinging at least one of the first and second reflection surfaces, such that a confocal optical system is formed between the confocal pinhole and the surface of the object.

2. A confocal optical device according to claim 1, wherein the confocal pinhole in the first reflection surface and the second reflection surface are located on an optical axis of the converging lens, and the light from the light source passes through the confocal pinhole along the optical axis of the converging lens.

3. A confocal optical device according to claim 1, wherein at least one of the first and second reflection surfaces and the driving means are included in an electrostatically driving mirror capable of scanning light two-dimensionally.

4. A confocal optical device according to claim 1, wherein at least one of the first and second reflection surfaces and the driving means are included in an electrostatically driving mirror capable of scanning light one-dimensionally.

5. A confocal optical device according to claim 1, further comprising a light transmitting section for transmitting the light from the light source to the light scanning section and transmitting the light from the light scanning section to the light detecting section.

6. A confocal optical device according to claim 5, wherein the light transmitting section includes a beam splitter for splitting the light traveling towards the light scanning section and the light traveling from the scanning section.

7. A confocal optical device according to claim 6, wherein the light transmitting section further includes an optical fiber for optically connecting the beam splitter and the light scanning section to each other.

8. A confocal optical device according to claim 5, wherein the light transmitting section includes a plurality of optical fibers and an optical coupler for optically connecting the plurality of optical fibers to each other.

9. A confocal optical device according to claim 8, wherein the plurality of optical fibers comprise multi-mode optical fibers.

10. A confocal optical device according to claim 8, wherein the plurality of optical fibers comprise single-mode optical fibers.

11. A confocal optical device according to claim 8, wherein the light transmitting section includes a lens, provided between end surfaces of the plurality of optical fibers, which are on the light scanning section side, and the confocal pinhole, for suppressing expansion of the light emitted from the end surface of the optical fibers, which are on the light scanning section side.

12. A confocal optical device according to claim 11, wherein the lens comprises a micro-lens formed on an end surface of each optical fiber.

13. A light scanning type confocal optical device comprising:
   a light source for outputting light;
   a light scanning section for converging light from the light source onto a surface of an object to be detected, and scanning the light over the surface;
   a confocal pinhole provided between the light source and the light scanning section, light that has passed through the confocal pinhole being substantially regarded as light from the point light source, such that a confocal optical system is formed between the confocal pinhole and the surface of the object; and
   a light detecting section for detecting that part of the light scanned by the light scanning section which is returned from the surface of the object;
   wherein the light scanning section comprises a first reflection surface having the confocal pinhole, a second reflection surface for reflecting the light from the light source, having passed through the confocal pinhole, towards the first reflection surface, a converging lens for converging the light reflected from the first reflection surface on the surface of the object to be detected, and driving means for swinging at least one of the first and second reflection surfaces, such that a confocal optical system is formed between the confocal pinhole and the surface of the object, and
   the second reflection surface comprises a reflection region formed on a surface of the converging lens, which is opposite to the first reflection surface.

14. A confocal optical device according to claim 13, wherein a ratio of a diameter of the reflection region to an outer diameter of the converging lens is 0.15 or less.

15. A confocal optical device according to claim 13, wherein the outer diameter D of the converging lens is 3.0 mm or less.

16. A confocal optical device according to claim 15, wherein the outer diameter D of the converging lens satisfies the following relationship:

$$1.0 \text{ mm} \leq D \leq 3.0 \text{ mm}.$$

17. A confocal optical device according to claim 13, wherein the converging lens has a non-spherical surface.

18. A confocal optical device according to claim 17, wherein the non-spherical surface is provided on the reflection region side of the converging lens.

19. A confocal optical device according to claim 17, wherein a radius R of curvature of the reflection region side of the converging lens, and the distance L taken from a position conjugated with a light converging position of the converging lens, to the converging lens, satisfy the following relationship:

$$R \leq 4 \times L.$$

20. A confocal optical device according to claim 17, wherein a refractive index of the converging lens, satisfy the following relationship:

$$nd \geq 1.6.$$

21. A confocal optical device according to claim 17, wherein an Abbe number of the converging lens, satisfy the following relationship:

$$vd \geq 40.$$

22. A confocal optical device according to claim 17, wherein an effective diameter d of the first reflection surface is 1.5 mm or less.

23. A confocal optical device according to claim 17, wherein the converging lens comprises a cemented lens in which a first lens and a second lens are cemented together, and the reflection region is formed on the first lens.

24. A confocal optical device according to claim 23, wherein the first and second lenses have different refractive indices, and the cemented surface of the cemented lens has a convex shape to the high refractive index side.

25. A confocal optical device according to claim 23, wherein the first and second lenses have different refractive indices, and the cemented surface of the cemented lens has a concave shape to the high refractive index side.

26. A confocal optical device according to claim 25, wherein both surfaces of the cemented lens are made non-spherical.

27. A confocal optical device according to claim 23, wherein the refractive index of the first lens is higher than that of the second lens.

28. A confocal optical device according to claim 17, wherein a refractive index nd1 of the first lens, satisfies the following relationship:

$$nd1 \geq 1.6.$$

29. A confocal optical device according to claim 13, wherein the converging lens comprises a single lens.

30. A confocal optical device according to claim 13, wherein the outer diameter D of the converging lens, a distance L taken from a position conjugated with a light converging position of the converging lens, to the converging lens, and a distance WD taken from the light converging position of the converging lens to the converging lens, satisfy the following relationship:

$$L > WD \times D / 2(WD+D).$$

31. A confocal optical device according to claim 30, wherein the distance L satisfies the following relationship:

$$L \geq 0.45 \text{ mm}.$$

32. A confocal optical device according to claim 30, wherein a focal distance f of the converging lens satisfies the following relationship:

$$f \geq 0.47 \text{ mm}.$$

33. A confocal optical device according to claim 13, wherein the distance L taken from a position conjugated with a light converging position of the converging lens, to the converging lens, and the distance WD taken from the light converging position of the converging lens to the converging lens, satisfy the following relationship:

$$0.7 \leq 3 \times WD \times L/(WD+3 \times L) \leq 2.5.$$

34. A confocal optical device according to claim 13, wherein the converging is corrected in terms of aberration for various wavelengths.

35. A confocal optical device according to claim 34, wherein the light source emits illumination light so as to make fluorescent light generate from the surface of the object, and the converging is corrected in terms of aberration for both a wavelength of the illumination light and a wavelength of the fluorescent light.

36. A confocal optical device according to claim 13, wherein the light detecting section includes a splitting optical element for splitting the illumination light and the fluorescent light, and a light detecting element for detecting each of the illumination light and the fluorescent light, which have been split.

* * * * *